US008190591B2

(12) United States Patent
Shinjo et al.

(10) Patent No.: US 8,190,591 B2
(45) Date of Patent: May 29, 2012

(54) BIT STRING SEARCHING APPARATUS, SEARCHING METHOD, AND PROGRAM

(75) Inventors: Toshio Shinjo, Chiba (JP); Mitsuhiro Kokubun, Chiba (JP)

(73) Assignee: S. Grants Co., Ltd., Chiba (JP)

( * ) Notice: Subject to any disclaimer, the term of this patent is extended or adjusted under 35 U.S.C. 154(b) by 270 days.

(21) Appl. No.: 12/458,776

(22) Filed: Jul. 22, 2009

(65) Prior Publication Data

US 2009/0287660 A1 Nov. 19, 2009

Related U.S. Application Data

(63) Continuation of application No. PCT/JP2007/001172, filed on Oct. 25, 2007.

(30) Foreign Application Priority Data

Jan. 24, 2007 (JP) ................................. 2007-013211

(51) Int. Cl.
*G06F 17/30* (2006.01)

(52) U.S. Cl. ........................................ 707/706; 707/797

(58) Field of Classification Search .................. 707/706, 707/797
See application file for complete search history.

(56) References Cited

U.S. PATENT DOCUMENTS

| 5,758,353 | A | * | 5/1998 | Marquis | 707/744 |
|---|---|---|---|---|---|
| 5,930,805 | A | * | 7/1999 | Marquis | 707/797 |
| 6,427,147 | B1 | * | 7/2002 | Marquis | 707/741 |
| 6,480,857 | B1 | * | 11/2002 | Chandler | 707/792 |
| 6,499,032 | B1 | * | 12/2002 | Tikkanen et al. | 707/693 |
| 6,505,206 | B1 | * | 1/2003 | Tikkanen et al. | 707/797 |
| 6,571,244 | B1 | * | 5/2003 | Larson | 707/753 |
| 6,594,655 | B2 | * | 7/2003 | Tal et al. | 707/797 |
| 6,662,184 | B1 | * | 12/2003 | Friedberg | 707/754 |
| 6,675,163 | B1 | | 1/2004 | Bass et al. | |
| 6,915,300 | B1 | * | 7/2005 | Roux et al. | 707/706 |
| 7,039,641 | B2 | * | 5/2006 | Woo | 370/400 |
| 7,130,847 | B2 | * | 10/2006 | Waters et al. | 707/706 |
| 7,162,481 | B2 | * | 1/2007 | Richardson et al. | 707/693 |

FOREIGN PATENT DOCUMENTS

| JP | H07-210569 A | 8/1995 |
|---|---|---|
| JP | 2001-202277 A | 7/2001 |
| JP | 2001-357070 A | 12/2001 |
| JP | 2003-224581 A | 8/2003 |
| JP | 2008-015872 A | 1/2008 |
| JP | 2008-112240 A | 5/2008 |

OTHER PUBLICATIONS

"*Patorishia Tsuri (Patricia Tree)*", vol. 11, No. 2, pp. 337-339, Journal of Japanese Society for Artificial Intelligence (Mar. 1, 1996).

(Continued)

*Primary Examiner* — don wong
*Assistant Examiner* — Kim T Nguyen
(74) *Attorney, Agent, or Firm* — Rader, Fishman & Grauer PLLC

(57) ABSTRACT

To provide a method that minimizes efficiency reductions in processing coupled node trees even if the size of the coupled node tree grows large. In basic searching or maximum or minimum value searching, the search history, not only the address information of the storage area wherein a node is stored but also the discrimination bit position of branch nodes traversed in the search path, is stored in the search path stack.

24 Claims, 22 Drawing Sheets

OTHER PUBLICATIONS

Akira Nakamori, "*Memori no Gainen wo Rikai suru (Understanding Memory Concept)*,"vol. 32, No. 2, pp. 44-53, Interface (Feb. 2, 2006) (In particular, the portion of the article entitled "Hairetsu o Shitei suruto Memory Ryoiki o Kakuho suru," pp. 49-50 of the same.).

Alfred V. Aho et al., "*Arugorizumu no Sekkei to Kaiseki I (The Design and Analysis of Computer Algorithms I), First Edition*", pp. 132-136, Saiensu-Sha Co. Ltd., Japan (Oct. 30, 1977).

Daichi Goto, "*Sawatte Manabu Data Kozo, Tsukatte Mini Tsuku Algorithm Kochira Java API Kenkyusho!*" Java Press, vol. 34, pp. 202-210 (Feb. 15, 2004).

R. Sedgewich, Algorithm, vol. 1, 1st edition, Kindai Kagaku Sha Co., Ltd. pp. 49-54 (Oct. 10, 1990).

Shigeaki Yazaki, "*Zu De Wakaru! Programming No. 10 Dai Kisochishiki Data Kozo,*" Nikkei Software, vol. 6, No. 2, pp. 44-45 (Jan. 24, 2003).

English translation of Office Action issued by Japan Patent Office in connection with Application No. 2006-293619 to show relevance of Documents BA, BD and CA-CC.

International Search Report (Aug. 14, 2007).

International Search Report (Jan. 8, 2008).

Communication from European Patent Office for application no. 07827921.3 dated Mar. 16, 2010.

P. Bumbulis et al., "A Compact B-tree", Proceedings of the 2002 Acm Sigmod International Conference on Management of Data, Online Jun. 3, 2002-Jun. 6, 2002, pgs. 533-541.

Jung M., et al., "A Dynamic Construction Algorithm for the Compact Patricia trie using the Hierarchical Structure", Information Processing & Management, Elsevier, Barking, GB, vol. 38, no. 2, Mar. 1, 2002, pgs. 221-236.

Li, et al., "Stateful Inspection Firewall Session Table Processing" School of Computer Science and Technology, Harbin Institute of Technology, International Journal Information Technology, vol. 11, No. 2, pp. 21-30 (2005).

Nilsson et al., "IP-Address Lookup Using LC-Tries", IEEE Journal on Selected Areas in Communications, vol. 17, No. 6, Jun. 1999, pp. 1083-1092.

\* cited by examiner

BIT STRING SEARCHING APPARATUS, SEARCHING METHOD, AND PROGRAM

CROSS-REFERENCE TO RELATED APPLICATION

This application is a continuation of PCT/JP2007/001172 filed on Oct. 25, 2007, and is based and claims the benefit of priority of the prior Japanese Patent Application No. 2007-013211, filed on Jan. 24, 2007, the entire contents of which are incorporated herein by reference. The contents of PCT/JP2007/001172 are incorporated herein by reference in their entity.

BACKGROUND OF THE INVENTION

1. Field of the Invention

The present invention relates to a searching apparatus that searches for a desired bit string from a set of bit strings and especially relates to the bit string search apparatus, search method, and program using the coupled node tree proposed by the applicant in Japanese patent application 2006-187827.

2. Description of Related Art

In recent years, with advancements in information-based societies, large-scale databases have come to be used in various places. To search such large-scale databases, it is usual to search for a desired record, retrieving the desired record by using as indexes items within records associated with addresses at which each record is stored. Character strings in full-text searches can also be treated as index keys. Because the index keys can be expressed as bit strings, the searching of a database is equivalent to searching for bit strings in the database. In order to perform the above-noted searching for bit strings at high speed, conventional art makes various refinements on the data structure in which bit strings are stored. One of these is a tree structure known as a Patricia tree.

FIG. 1 describes an example of a Patricia tree used for searching processing in the above-noted conventional art. A node of a Patricia tree is formed to include an index key, a test bit position for a search key, and right and left link pointers. Although it is not explicitly described, a node of course includes information for the purpose of accessing a record corresponding to the index key.

In the example described in FIG. 1, the node 1750a that holds the index key "100010" is a root node, the test bit position 1730a of which is 0. The node 1750b is connected to the left link 1740a of the node 1750a, and the node 1750f is connected to the right link 1741a of the node 1750a.

The index key held by the node 1750b is "010011," and the test bit position 1730b is 1. The node 1750c is connected to the left link 1740b of the node 1750b, and the node 1750d is connected to the right link 1741b of the node 1750b. The index key held by the node 1750c is "000111," and the test bit position is 3. The index key held by the node 1750d is "011010," and the test bit position is 2.

The parts connected to the node 1750c by a solid lines show the right and left link pointers of the node 1750c, and the left pointer 1740c that is not connected by the dotted line indicates that that field is blank. The dotted line connection destination of the right pointer 1741c that is connected by a dotted line expresses the address indicated by the pointer, and in this case this indicates that the right pointer points to the node 1750c.

The right pointer 1741d of the node 1750d points to the node 1750d itself, and the node 1750e is connected to the left link 1740d. The index key held by 1750e is "010010," and the test bit position is 5. The left pointer 1740e of the node 1750e points to the node 1750b, and the right pointer 1741e of the node 1750e points to the node 1750e.

The index key held by the node 1750f is "101011," and the test bit position 1730f is 2. The node 1750g is connected to the left link 1740f of the node 1750f and the node 1750h is connected to the right link 1741f of the node 1750f.

The index key held by the node 1750g is "100011," and the test bit position 1730g is 5. The left pointer 1740g of the node 1750g points to the node 1750a, and the right pointer 1741g of the node 1750g points to the node 1750g.

The index key held by the node 1750h is "101100," and the test bit position 1730h is 3. The left pointer 1740h of the node 1750h points to the node 1750f, and the right pointer 1741h of the node 1750h points to the node 1750h.

In the example of FIG. 1, the configuration is such that, as the tree is traversed downward from the root node 1750a the test bit position of successive nodes increases. When a search is performed with some search key, the search keys' bit values corresponding to test bit positions held in nodes are successively tested from the root node, and a judgment is made as to whether the bit value at a test bit position is 1 or 0, the right link being followed if the bit value is 1, and the left link being followed if the bit value is 0. Unless the test bit position of a link target node is larger than the bit position of the link origin node, that is, if the link target is not below but rather returns upward (the returning links described by the dotted lines in FIG. 1 being called back links), a comparison is performed between the index key of the link target and the search key. It is assured that if the result of the comparison is that the values are equal the search succeeds, but if the result is non-equal, the search fails.

As described above, although search processing using a Patricia tree has the advantages of being able to perform a search by testing only the required bits, and of it only being necessary to perform an overall key comparison one time, there are the disadvantages of an increase in storage capacity caused by the inevitable two links from each node, the added complexity of the decision processing because of the existence of back links, delay in the search processing by comparison with an index key for the first time by returning by a back link, and the difficulty of data maintenance such as adding and deleting a node.

In order to resolve these disadvantages of the Patricia tree, there is, for example, the technology disclosed in Patent Document 1 below. In the Patricia tree described in Patent Document 1 below, by storing lower level sibling nodes in a contiguous area, the space need for pointers is reduced as well as by setting a bit in each node to show whether or not the next link is a back link the determination processing for back links is reduced.

However, even in the disclosure of Patent Reference 1 below, since each node always reserves an area for the index key and the area for a pointer, and a single pointer is used for storing lower level sibling nodes in a contiguous area as described for example even in the parts of left pointer 1740c, right pointer 1741h, etc. that are the lowest level parts of the Patricia described in FIG. 1, the same amount of space must be allocated, etc., and there is not a very big space reduction effect. Also the problem of the delay in the search processing caused by a back links, and the difficulty of processing such as adding and deleting, etc., is not improved.

Patent Document 1: Japanese Published Patent Application 2001-357070

SUMMARY OF THE INVENTION

In order to resolve the problems in the above-noted conventional art, in Japanese patent application 2006-187827 the applicant proposes a bit string search using a coupled node tree, which tree is a tree structure for bit string searches formed by a root node and a node pair stored in adjacent areas that is formed by a branch node and a leaf node, branch nodes, or leaf nodes; the root node showing the start point of the tree and being a leaf node if there is only one node in the tree and being a branch node if there are two or more nodes in the tree; the branch node including a discrimination bit position in the search key and information indicating a position of one node of a node pair of a link target; and the leaf node containing index keys that are the target bit strings of a bit string search.

The above cited patent application shows a method for creating a coupled node tree from a set of received index keys and basic search methods using a coupled node tree, such as methods for searching for a single index key from that coupled node tree, etc.

Also the bit string searches may also include various kinds of search requests, such as requests to find a minimum value or maximum value or searches for a value within a given range, etc. Regarding this point, the applicant proposed methods, etc., of obtaining maximum or minimum values of index keys included in any arbitrary subtree of a coupled node tree in Japanese patent application 2006-293619.

The applicant also proposed splitting or conjoining methods for coupled node trees in Japanese patent application 2006-319407. The searching methods proposed in the above three patent applications are based on operation for successively traversing branch nodes from the search start node to the leaf node and obtaining the index key stored in the leaf node and for successively storing in a stack the array element number of array elements in which are stored the nodes corresponding to the nodes traversed from the search start node to the leaf node, as a search history of the address information of the storage area in which nodes are positioned. Thus in the various processing that follows search processing, based on the address information stored in the stack, the node stored in the storage area expressed by that address information is referenced and the discrimination bit position is obtained.

As for the above address information, if a coupled node tree is stored in an array, the array element numbers of that array can be used and the number of bits needed to express that address information can be reduced, but as the scale of the coupled node tree grows, the range of addresses needed to actually store the nodes also grows, and when various processing is executed on the computer, the possibility of cache misses increases and there may be a possibility that processing efficiency will decrease.

The purpose of this invention is to provide a method that minimizes efficiency reductions in processing coupled node trees even if the size of the coupled node grows large.

According to this invention, in the search processing of basic searches or maximum or minimum value searches, the search history is stored in a search path stack, which stack contains not only the address information of the storage area wherein a node is stored but also the discrimination bit position of branch nodes traversed in the search path.

The discrimination bit position of nodes traversed in search processing is also extracted from the search path stack in the processing of inserting index keys and in the processing of coupled node tree splitting or conjoining, each of which processing searches the discrimination bit position.

According to this invention, when the discrimination bit position of nodes traversed in search processing becomes needed, that information can be obtained from a search path stack that holds the search history and even when the scale of the coupled node tree grows immense, there is little likelihood that a cache miss occurs accessing that information.

DESCRIPTION OF THE PREFERRED EMBODIMENTS

First, an exemplary embodiment is described which stores in an array a coupled node tree, which coupled node tree was proposed by this inventor in the above cited patent application and which is presupposed by this invention. The address information of a storage device could be used as the data held in a branch node that shows the position of a link target, but by using an array of array elements that can store a larger amount of the areas occupied by branch nodes and leaf nodes, the node position can be expressed with an array element number, and the amount of information needed for the position information can be reduced.

Figure 2A:
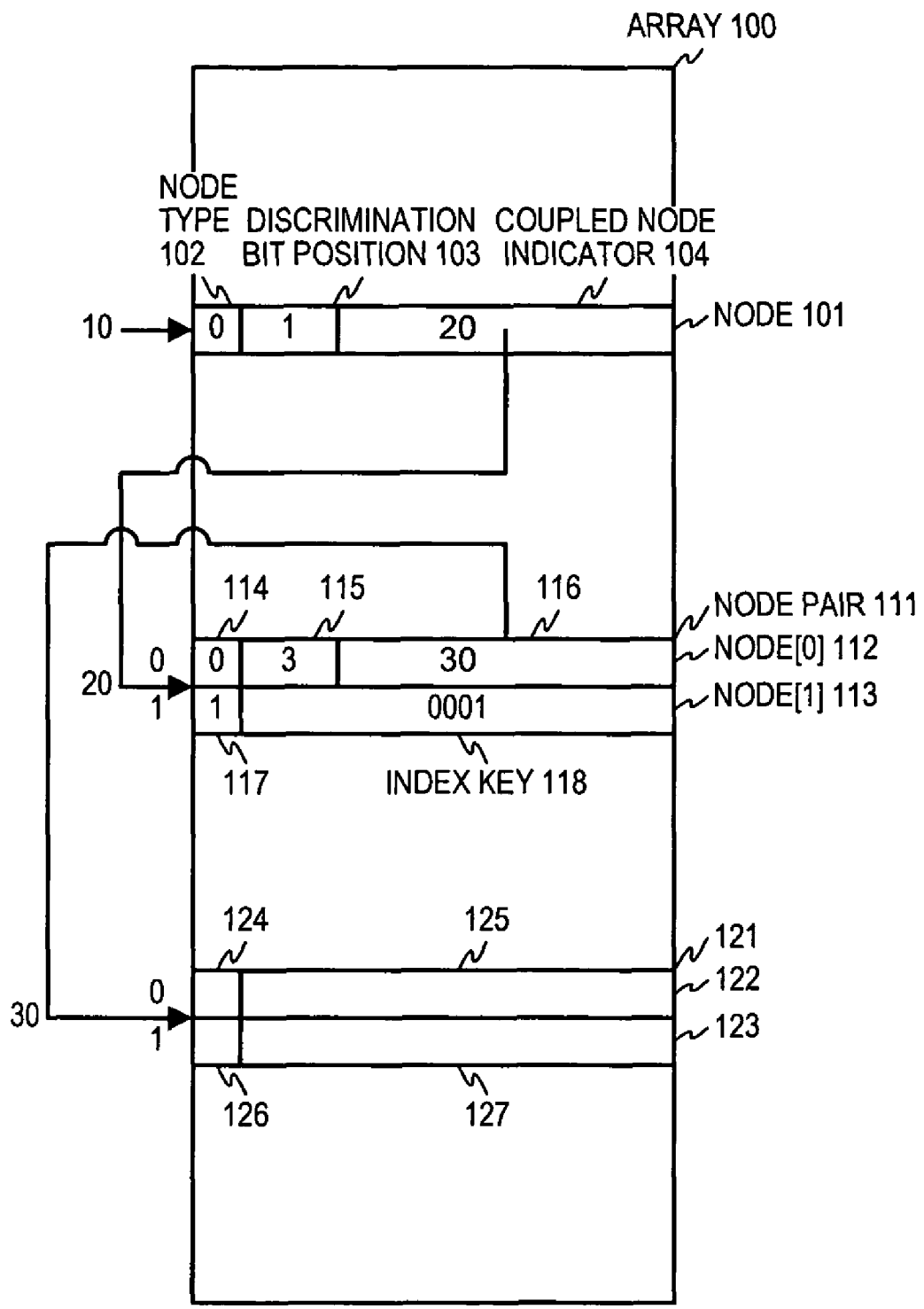
FIG. 2A is a drawing describing an exemplary configuration of a coupled node tree stored in an array.

FIG. 2A is a drawing that describes an exemplary configuration of a coupled node tree that is stored in an array. Referring to FIG. 2A, a node 101 is located at the array element of the array 100 with the array element number 10. The node 101 is formed by a node type 102, a discrimination bit position 103, and a coupled node indicator 104. The node type 102 is 0, which indicates that the node 101 is a branch node. The value 1 is stored in the discrimination bit position 103. The coupled node indicator 104 has stored in it the array element number 20 of the primary node of the node pair of the link target. To simplify notation hereinafter, the array element number stored in a coupled node indicator is sometimes called the coupled node indicator. Also, the array element number stored in a coupled node indicator is sometimes expressed as the code appended to that node or the code attached to a node pair.

The array element having the array element number 20 has stored therein a node [0] 112, which is the primary node of the node pair 111. The secondary node [1] 113 forming a pair with the primary node is stored into the next, adjacent, array element (array element number 20+1). The value 0 is stored in the node type 114 of the node [0] 112, the value 3 is stored in the discrimination bit position 115, and the value 30 is stored in the coupled node indicator 116. The value 1 is stored in the node type 117 of the node [1] 113, thereby indicating that the node 1[113] is a leaf node. The value "0001" is stored in the index key 118. In the same manner as in a Patricia tree described above, although information for accessing a record corresponding to an index key is of course included in a leaf node, this is omitted from the notation.

Primary nodes are indicated as the node [0], and secondary nodes that are paired therewith are indicated as the node [1]. Also the node stored in an array element with some array element number is called the node of that array element number and the array element number stored in the array element of that node is also called the array element number of the node.

The contents of the node pair 121 formed by the node 122 and the node 123 that are stored in the array elements having array element numbers 30 and 31 are not described. The 0 or 1 that is appended to the node [0] 112, the node [1] 113, the node 122, and the node 123 indicates respectively to which node of the node pair linking is to be done when performing a search using a search key. Linking is done to the node having an array element number that is derived by adding the 0 or 1, which is the bit value of the search key at the discrimination bit position of the immediately previous branch node, to the coupled node indicator of the branch node.

Therefore, by adding the bit value of the discrimination bit position of the search key to the coupled node indicator of the immediately previous branch node, it is possible to determine the array element number of an array element storing a node at the link target.

Figure 1:
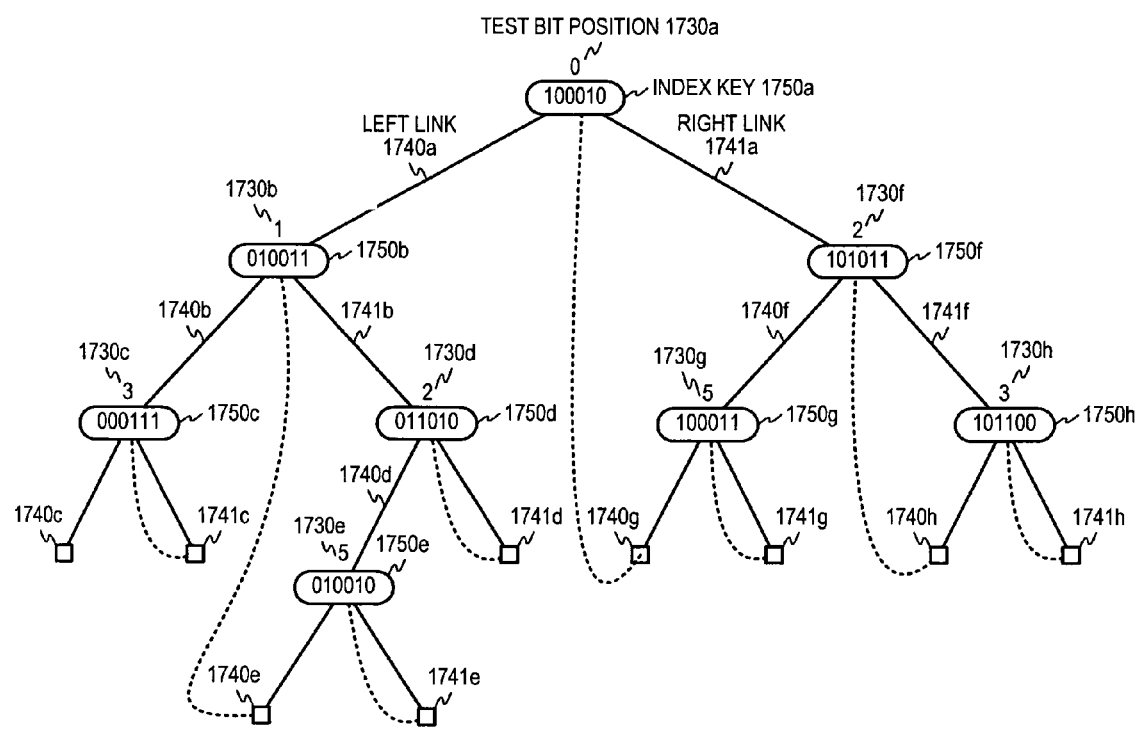
FIG. 1 is a drawing describing an example of a Patricia tree used in searching in the conventional art.
Figure 2B:
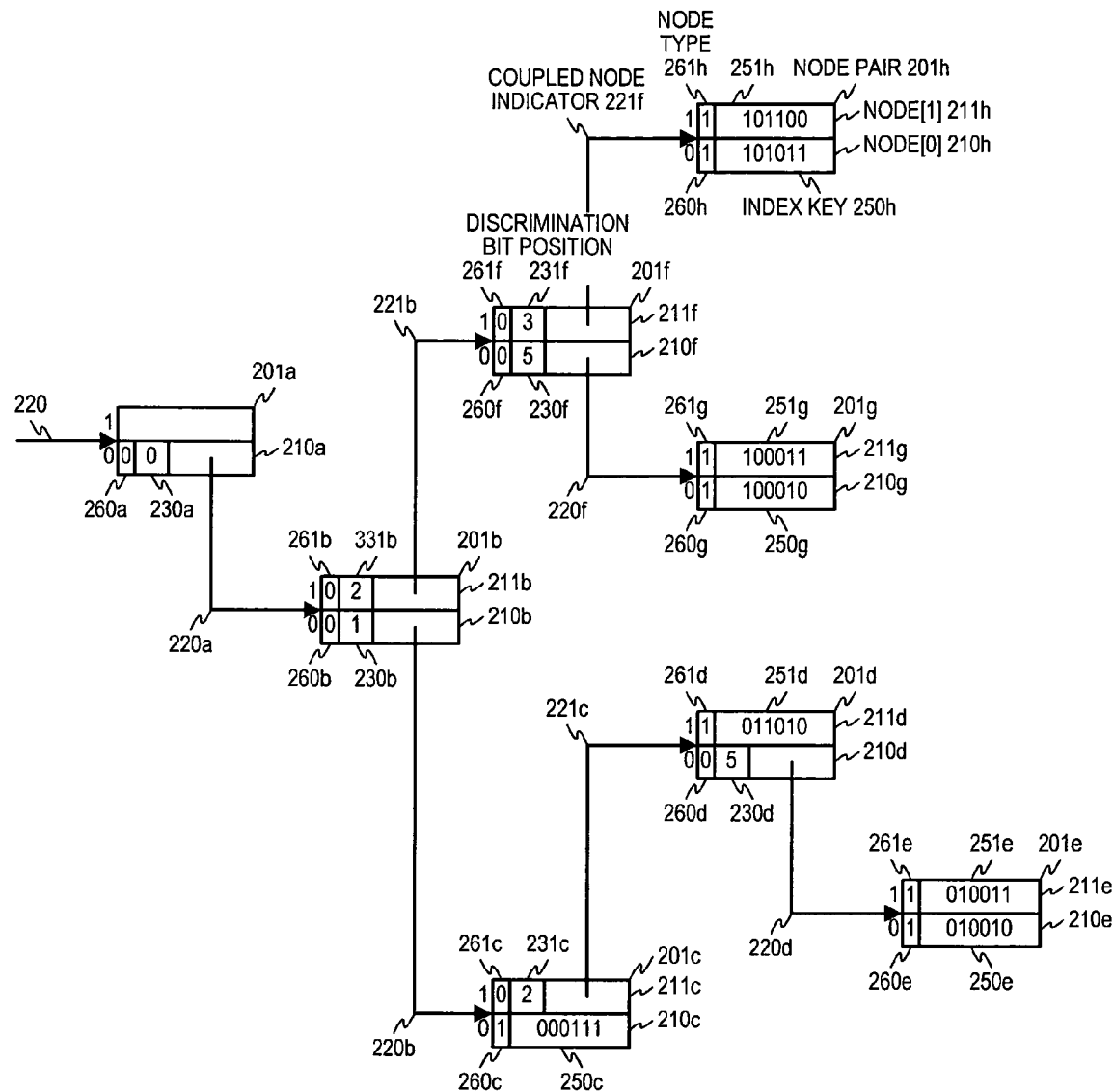
FIG. 2B is a drawing describing a tree structure of a coupled node tree.

Although in the above-noted example the smaller of the array element numbers at which the node pair is located is used as the coupled node indicator, it will be understood that it is also possible to use the larger of the array element numbers in the same manner. FIG. 2B is a drawing that conceptually describes an embodiment of a tree structure of a coupled node tree. The 6-bit index key that is illustrated is the same that of the Patricia tree described as an example in FIG. 1.

The reference numeral 210a shows the root node. In the example described, the root node 210a is the primary node of the node pair 201a located at the array element number 220. In this tree structure, a node pair 201b is located below the root node 210a, and below that are located the node pair 201c and the node pair 201f. Below the node pair 201f are located the node pair 201h and the node pair 201g. Below the node pair 201c is located the node pair 201d, and below the node pair 201d is located the node pair 201e.

The 0 or 1 code that is appended before each node is the same as the codes that are appended before the array element numbers described in FIG. 2A. The tree is traversed in accordance with the bit values at discrimination bit positions of the search key, so that the leaf node of the search for item is found.

In the example described, the node type 260a of the root node 210a is 0, thereby indicating that this is a branch node, and the discrimination bit position 230a indicates 0. The coupled node indicator is 220a, which is the array element number of the array element in which the primary node 210b of the node pair 201b is stored.

The node pair 201b is formed by the node 210b and the node 211b, the node types 260b and 261b thereof both being 0, indicating branch nodes. The discrimination bit position 230b of the node 210b has 1 stored therein, and in the coupled node indicator of the link target is stored the array element number 220b of the array element in which is stored the primary node 210c of the node pair 201c.

Because 1 is stored in the node type 260c of the node 210c, this node is a leaf node, and thus includes an index key. "000111" is stored in the index key 250c. The node type 261c of the node 211c is 0, the discrimination bit position 231c of the node 211c is 2, and in the coupled node indicator is stored the array element number 221c of an array element in which is stored the primary node 210d of the node pair 201d.

The node type 260d of the node 210d is 0, the discrimination bit position 230d of the node 210d is 5, and in the coupled node indicator is stored the array element number 220d of an array element in which is stored the primary node 210e of the node 201e. The node type 261d of the node 211d that is paired with the node 210d is 1, and "011010" is stored in the index key 251d.

The node types 260e and 261e of the nodes 210e and 211e of the node pair 201e are both 1, indicating that both are leaf nodes. In the index keys 250e and 251e of each are stored "010010" and "010011" respectively as index keys.

The discrimination bit position 231b of the node 211b, which is the other node of the node pair 201b, has 2 stored therein, and the array element number 221b of the array element in which is stored the primary node 210f of the node pair 201f is stored in the coupled node indicator of the link target.

The node types 260f and 261f of the nodes 210f and 211f of the node pair 201f are both 0, indicating that both are branch nodes. In the discrimination bit positions 230f and 231f of each are stored 5 and 3, respectively. The array element number 220f of the array element in which is stored the primary node 210g of the node pair 201g is stored in the coupled node indicator of the node 210f, and the array element number 221f of an array element in which is stored the node [0]210h, which is the primary node of the node pair 201h, is stored in the coupled node indicator of the node 211f.

The node types 260g and 261g of the nodes 210g and 211g of the node pair 201g are both 1, indicating that both are leaf nodes, and "100010" and "100011" are stored in the index keys 250g and 251g thereof, respectively.

In the same manner, the node types 260h and 261h of the node [0]210h of the node pair 201h, and the node [1]211h, which is paired therewith, are both 1, indicating that both are leaf nodes, and "101011" and "101100" are stored in the index keys 250h and 251h thereof, respectively.

The processing flow in searching for the index key "100010" from the above-noted tree is briefly described below. The discrimination bit positions are numbered 0, 1, 2, . . . and so on from the left. First, processing is started from the root node 210a using the bit string "100010" as the search key. Because the discrimination bit position 230a of the root node 210a is 0, examining the bit value of the discrimination bit position 0 reveals 1. This being the case, 1 is added to the array element number 220a stored in the coupled node indicator and linking is done to the node 211b stored in the resulting array element number. Because 2 is stored in the discrimination bit position 231b of the node 211b, examination of the bit value of the discrimination bit position 2 reveals 0, resulting in linking to the node 210f stored in the array element having the array element number 221b stored in the coupled node indicator.

Because 5 is stored in the discrimination bit position 230f of the node 210f, and because examination of the bit value of the discrimination bit position 5 of the search key "100010" reveals 0, linking is done to the node 210g stored in the array element having the array element number 220f stored in the coupled node indicator.

Because the node type 260g of the node 210g is 1, indicating a leaf node, the index key 250g is read out and a comparison is performed with the search key, thereby revealing coincidence between the two, both of which are "100010". Searching is performed in this manner using the coupled node tree.

Next, the significance of the configuration of the coupled node tree will be described, with reference made to FIG. 2B. The configuration of the coupled node tree is defined according to a set of index keys. In the example of FIG. 2B, the discrimination bit position of the root node 210a is 0 because there is an index key having a 0 at the 0th bit and an index key having a 1 at the 0th bit in the index keys described in the embodiment example of FIG. 2B. The group of index keys having 0 at the 0th bit is classified under the node 210b, and the group of index keys having 1 at the 0th bit is classified under the node 211b.

That the discrimination bit position of the node 211b is 2 reflects a property of the index keys, this being that the 1st bits of all the nodes 211h, 210h, 211g, and 210g are the same value 0, a difference therebetween first occurring at the 2nd bit.

Similar to the case of the 0th bit, the cases of the 2nd bit being 1 are classified on the node 211f side, and the cases of the 2nd bit being 0 are classified on the node 210f side. Then because index keys having a 2nd bit that is 1 differ with regard to the 3rd bit, 3 is stored in the discrimination bit position of the node 211f, and because the 3rd and 4th bits of index keys having 0 as the 2nd bit are the same and differ at the 5th bit, 5 is stored in the discrimination bit position of the node 210f.

At the link target of the node 211f, because there is only one having a 3rd bit of 1 and one having a 3rd bit of 0, nodes 210h and 211h are leaf nodes, with "101011" and "101100" stored in the index keys 250h and 251h, respectively.

Even in the event that the index key set includes "101101" or "101110" in place of "101100," because there is equality with "101100" up until the 3rd bit, only the index key stored in the node 211h would change, there being no change in the structure of the tree itself. However, if "101101" is included in addition to "101100," the node 211h would become a branch node, the discrimination bit position thereof being 5. If the index key to be added is "101110," the discrimination bit position would be 4.

As described above, the coupled node tree structure is determined by the bit values of each bit position of the index keys included in the set of index keys. To add to the above, because there is branching for each bit position having different bit values, meaning between a node that has a bit value of 1 and a node that has a bit value of 0, if the leaf nodes are traversed giving priority to the node [1] side and the tree depth direction, the index keys stored therewithin will be "101100" for the index key 251h of the node 211h, "101011" for the index key 250h of the node 210h, . . . , and "000111" for the index key 250c of the node 210c, these being sorted in descending order.

That is, in a coupled node tree the index keys are disposed in the tree in a sorted sequence. When searching using a search key, the index key is followed over a path disposed on a coupled node tree, and in the case, for example of a search key "101100" it is possible to reach the node 211h. As can be imagined from the above-noted description, even if the search key is made "101101" or "101110," the node 211h will be reached, and a comparison with the index key 251h will result in the search failing.

Also, even in the case in which searching is done with "100100," in the link path of nodes 210a, 211b, and 210f, because the 3rd and 4th bits of the search key are not used and the 5th bit is 0, the node 210g will be reached, similar to the case searching with "100010." In this manner, the discrimination bit positions are used in accordance with bit makeup of the index keys stored in the coupled node tree to perform branching.

Figure 3:
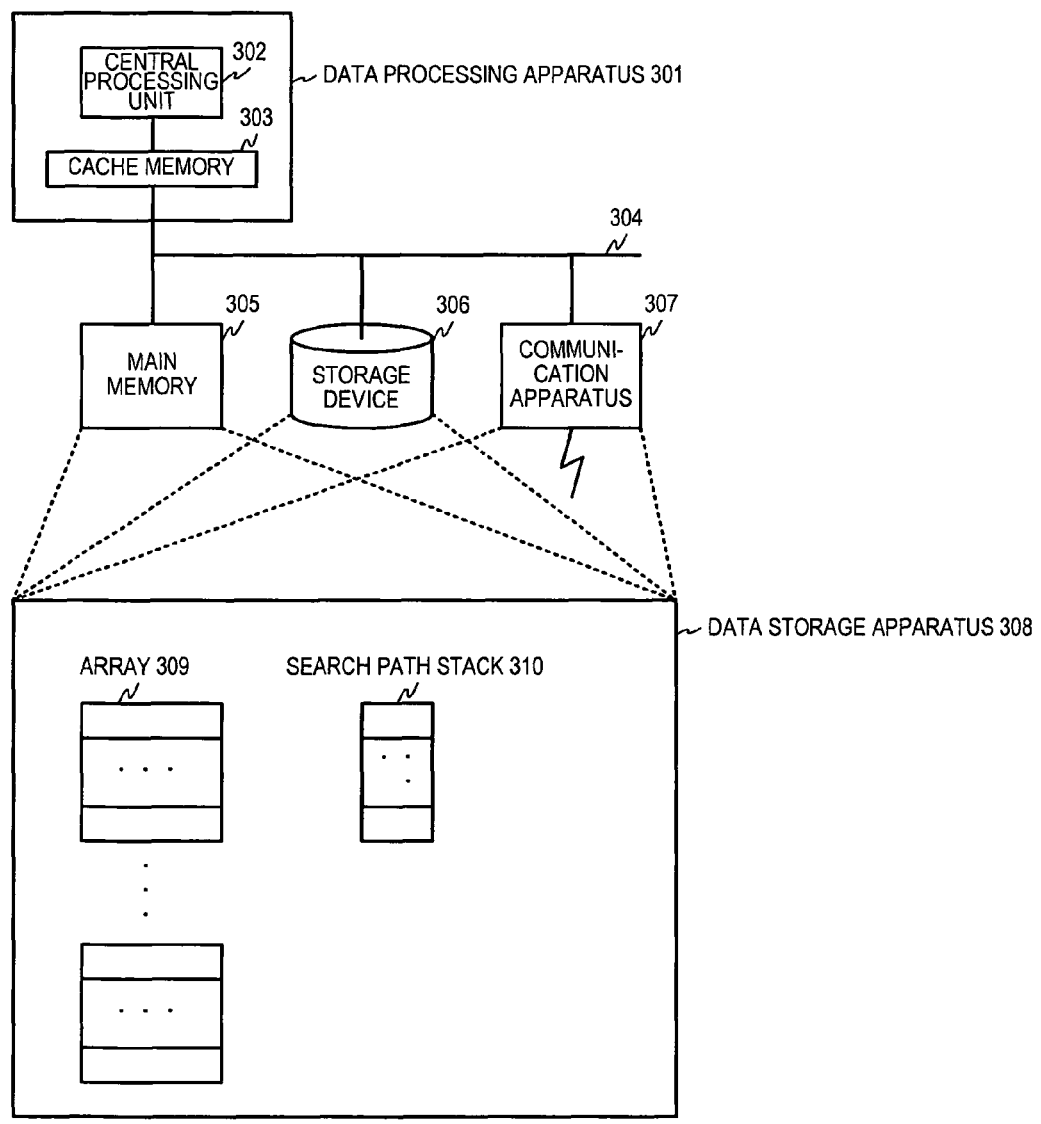
FIG. 3 is a drawing describing an exemplary hardware configuration for embodying the present invention.

FIG. 3 is a drawing describing an example of a hardware configuration for embodying the present invention. Search processing and data maintenance are implemented with the searching apparatus of the present invention by a data processing apparatus 301 having at least a central processing unit 302 and a cache memory 303, and a data storage apparatus 308. The data storage apparatus 308, which has an array 309 into which is disposed a coupled node tree, and a search path stack 310, into which are stored array element numbers of nodes which are traversed during the search and also information which are contained in the nodes, can be implemented by a main memory 305 or a storage device 306, or alternatively, by using a remotely disposed apparatus connected via a communication apparatus 307.

In the example described in FIG. 3, although the main memory 305, the storage device 306, and the communication apparatus 307 are connected to the data processing apparatus 301 by a single bus 304, there is no restriction to this connection method. The main memory 305 can be disposed within the data processing apparatus 301, and the search path stack 310 can be implemented as hardware within the central processing unit 302. It will be understood that it is alternatively possible to select appropriate hardware elements in accordance with the usable hardware environment and the size of the index key set, for example, having the array 309 held in the storage device 306 and having the search path stack 310 held in the main memory 305.

Also, although it is not particularly illustrated, a temporary memory area can of course be used to enable various values obtained during processing to be used in subsequent processing. Hereinafter this invention will be described in terms of using information stored in a search history stack, which stack contains not only the address information of the storage area wherein a node is stored but also the discrimination bit position of a branch node, and which stack is used in various processing proposed by the applicant for the above patent applications, such as the basic search processing using the coupled node tree, the insertion and deletion processing for a coupled node tree, processing applications such as obtaining the maximum and/or minimum value of index keys, and the splitting and conjoining of coupled node trees.

Figure 4A:
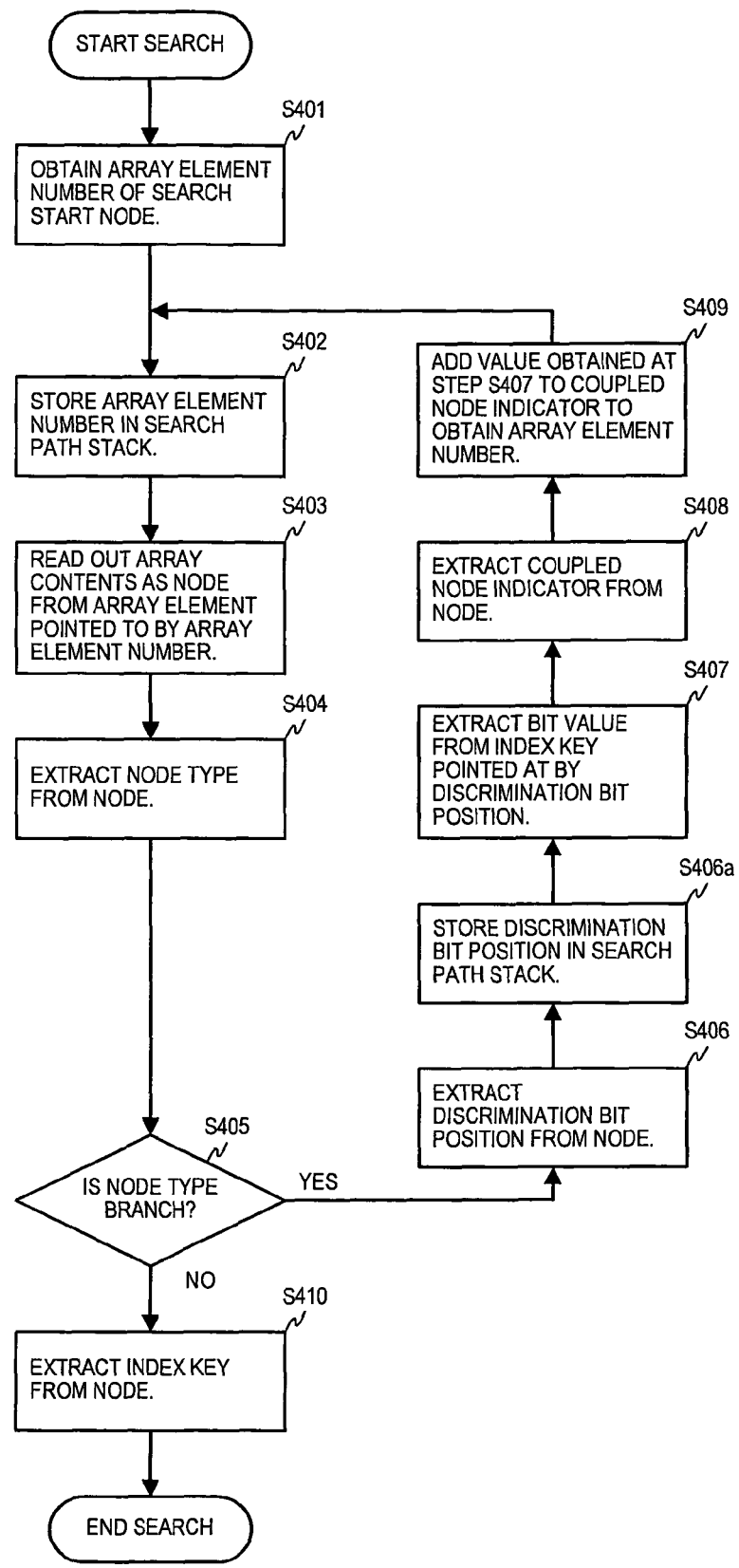
FIG. 4A is a flowchart describing the basic operation of a bit string search in an embodiment of the present invention.

FIG. 4A is a flowchart showing search processing in an embodiment of the present invention. The flowchart in FIG. 4A is the flowchart showing basic operations of the bit string search proposed in Japanese Patent Application 2006-293619, previously filed by the applicant of the present invention, with the processing of step S406a added for storing discrimination bit position in the search path stack 310.

First, in step S401 the array element number of the search start node is acquired. The search start node can be any node configuring the coupled node tree and it is stored in the array position that corresponds to the obtained array element number. How the search start node is specified will be described later in the descriptions of the various search applications.

Next, at step S402, the array element number acquired is stored on the search path stack 310. Proceeding to step S403, the array element of the array element number is read out as a node to be referenced. At step S404, the node type is extracted from the read out node. Next at step S405, a determination is made as to whether the node type is a branch node or not.

If the determination made at step S405 is that the node type is a branch node, processing proceeds to step S406. At step S406, the discrimination bit position is extracted from the node. Next, at step S406a, the discrimination bit position extracted at step S406 is stored on the search path stack, then, at step S407, the bit value of the search key at the discrimination bit position extracted at step S406 is obtained. Next, proceeding to step S408, the coupled node indicator is obtained from the node. Then, proceeding to step S409, the bit value obtained at step S407 is added to the coupled node indicator obtained at step S408, thereby obtaining the array element number of the link target node, and return is made to step S402.

Thereafter, the processing from step S402 to step S409 is repeated until the determination at step S405 is that the node is a leaf node and processing proceeds to step S410. At step S410, the index key is extracted from the leaf node, and processing ends.

Figure 4B:
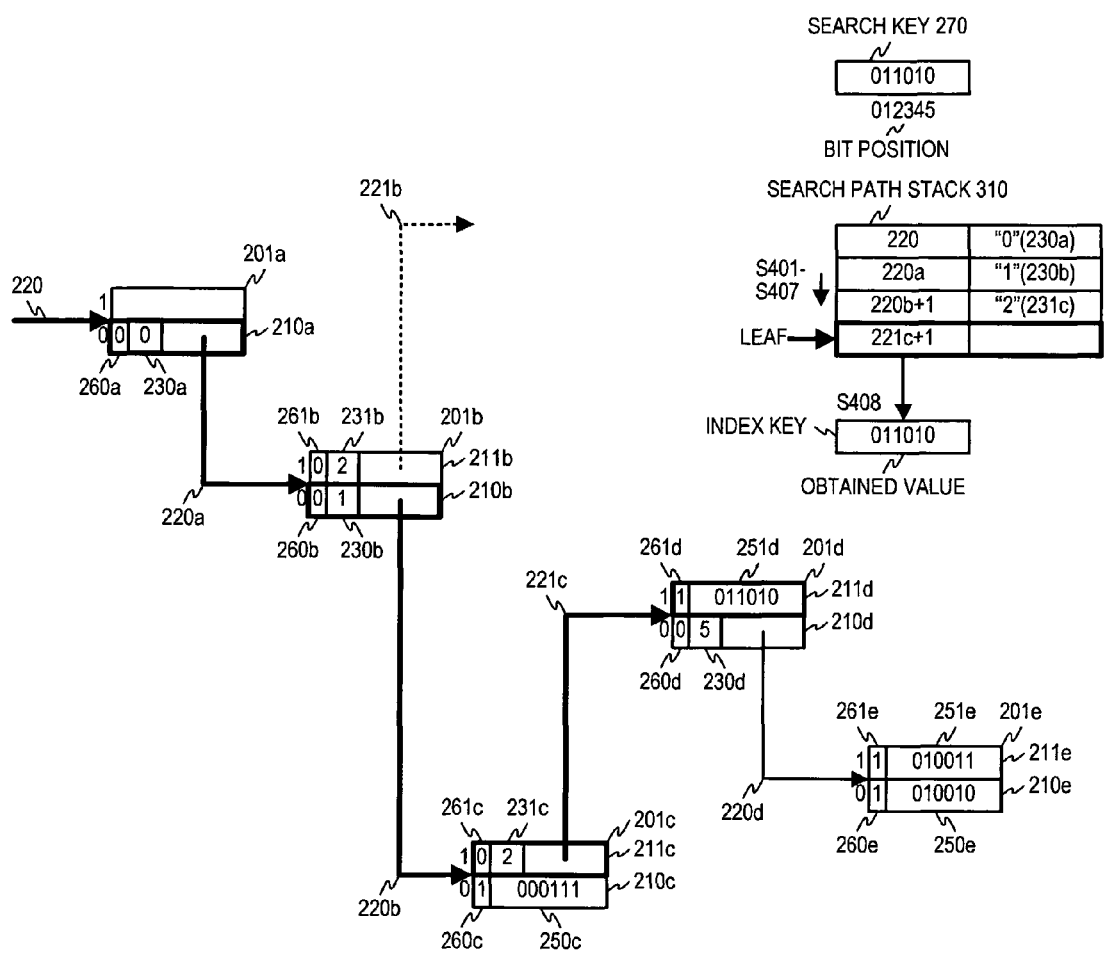
FIG. 4B is a drawing describing the basic operation of the bit string search using a coupled node tree in an embodiment of the present invention.

FIG. 4B is a figure describing the basic operations of a bit string search related to the embodiment of this invention described in the flowchart of FIG. 4A based on the coupled node tree embodiment exemplified in FIG. 2B. In FIG. 4B is described a coupled node tree, the search key save area 270 and the search path stack 310. Hereinafter, the nodes referenced on the coupled node tree and the status of the search path stack will be described using FIG. 4B.

Also, FIG. 4B only shows the parts of the coupled node tree described in FIG. 2B that are necessary to explain the processing in FIG. 4A. An explanation of the remaining nodes (the nodes from coupled node indicator 221b and below) is omitted. Henceforth, the same applies to explanations of drawings intended to explain nodes referenced on a coupled node tree.

First, assume that the array element number 220 is set as the array element number of the node for starting the search. Then the corresponding array element number 220 is pushed onto the search path stack 310 and the various information in the array element is referenced.

Based on the information stored in the array, when it is recognized that the node with the array element number 220 is a branch node and does not contain an index key, reference is again made to information (coupled node indicator or discrimination bit position or others) stored in the array for array element number 220 and array element number to be referenced next is computed.

Here the array element number 220 is stored in search path stack 310 and the node type 260a for node 210a with array element number 220 is extracted. Since the extracted node type 260a is, as described in the drawing, "0", the node 210a is described to be a branch node, and the value "0" of discrimination bit position 230a is extracted from node 210a and is stored in the search path stack 310 along with the array element number 220.

Then the bit value "0" is extracted from the discrimination bit position in the search key "011010" in the search key save area 270. Next the coupled node indicator 220a stored in node 210a is extracted and added to the bit value previously extracted from the discrimination bit position of the search key and the value obtained "220a" is stored in the search path stack 310.

Next, when the node type 260b is read out from the node with array element number 220a, since node 210b of array element number 220a is determined to be a branch node, the bit value "1" corresponding to the node discrimination bit position 230b is stored in search path stack 310 and when the bit value corresponding to discrimination bit position 1 is extracted from the search key "011010" the value is "1". Then the bit value "1" obtained is added to the coupled node indicator 220b of node 210b and "220b+1" is stored in the search path stack 310.

Since the node type read out from the node 211c of the array element number "220b+1" is a branch node, the value "2" of the discrimination bit position 231c is stored in the search path stack 310 and when the bit value corresponding to the node discrimination bit position "2" is extracted from the search key "011010" the value is "1". The bit value "1" obtained is added to the coupled node indicator 221c of node 211c and "221c+1" is stored in the search path stack 310.

When the node type is extracted from node 211d of the array element number "221c+1", node 211d is found to be a leaf node. Then the index key "011010" is extracted from node 211d and processing is terminated.

In this way, by referring to the information in each node successively and executing link processing, the array element numbers from the array element number 220 of node 210a, which is the search start node, to the array element number 221c+1 of leaf node 211d are pushed into search path stack 310 in the link sequence.

Figure 5A:
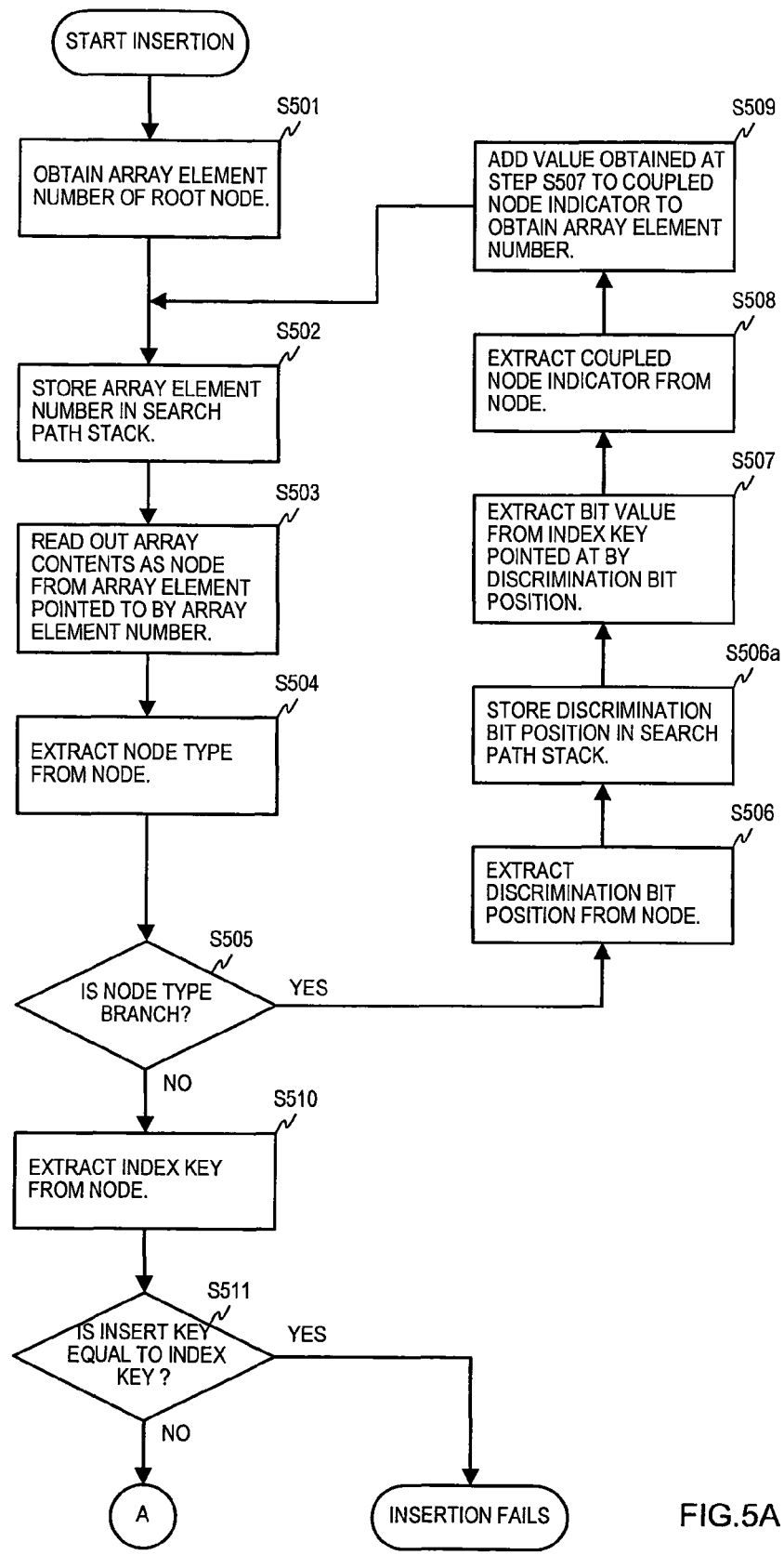
FIG. 5A is a flowchart describing the flow of search processing, which is the first part of the insertion processing in an embodiment of the present invention.
Figure 5B:
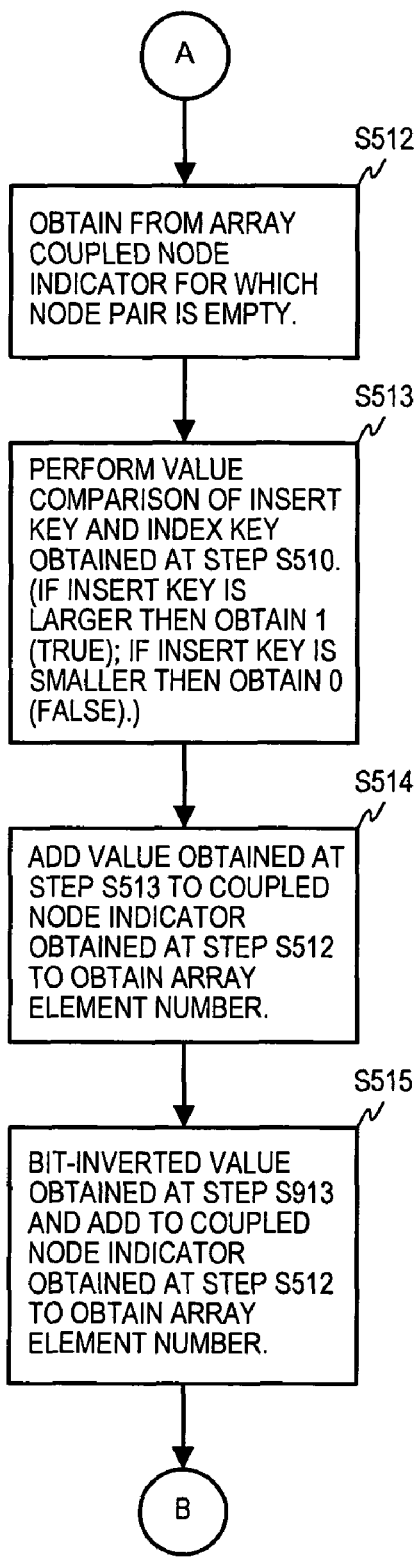
FIG. 5B is a drawing describing the processing flow for preparing array elements for a node pair to be inserted in insertion processing in an embodiment of the present invention.
Figure 5C:
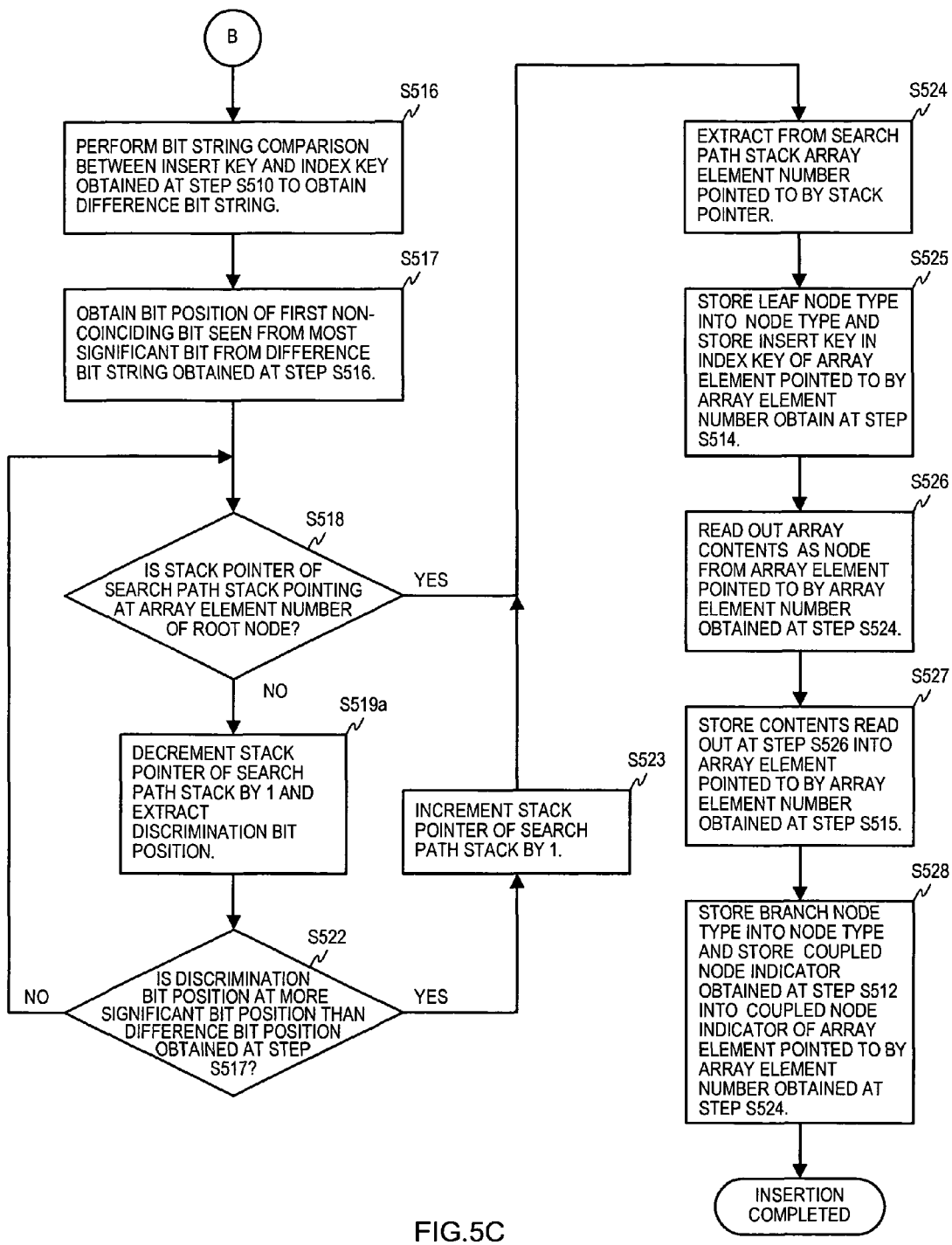
FIG. 5C is a drawing showing the processing flow for determining the position at which a node pair is to be inserted, and the storing of the content of each node of the node pair to complete the insertion processing.

Next, FIG. 5A to FIG. 5C and FIG. 6 will be used to describe node insertion processing in a coupled node tree. FIG. 5A to FIG. 5C describe the usual insertion processing, and FIG. 6 describes the processing for insertion of a root node. By root node insertion processing and usual insertion processing, because a coupled node tree is generated, the description of the node insertion processing is also a description of the processing to generate a coupled node tree.

FIG. 5A is a drawing showing the processing flow for search processing, which is the first stage of insertion processing, this corresponding to the using of an insertion key as a search key in the search processing described in FIG. 4A. Because the processing of step S501 to step S510 corresponds completely to step S401 to step S410 of FIG. 4A, these steps will not be explained herein.

At step S511 in FIG. 5A, a comparison is performed between the insertion key and the index key and, because if there is equality the insertion key already exists in the coupled node tree, the insertion fails, and processing ends. If, however, there is no equality, processing proceeds to step S512 and thereafter in FIG. 5B.

FIG. 5B is a processing flowchart describing the processing to prepare array elements for a node pair to be inserted. At step S512, empty node pair are obtained from the array, and the array element number of the array element to be made the primary node of the node pair is acquired.

Proceeding to step S513, a value comparison is performed between the insertion key and the index key acquired at step S510 and, in the case in which the insertion key is larger, the Boolean value 1 is obtained, but if the insertion key is smaller, the Boolean value 0 is obtained. Proceeding to step S514, the Boolean value obtained at step S513 is added to the array element number of the primary node obtained at step S512 to obtain an array element number.

Proceeding to step S515, the Boolean value obtained at step S513 is added to the array element number of the primary node obtained at step S512 to obtain an array element number. The array element number obtained at step S514 is the array element number of the array element into which a leaf node having the insertion key as an index key is stored, and the array element number obtained at step S515 is the array element number into which a node that formed a pair with that leaf node is stored.

That is, by means of the value relationship between the index key stored in the leaf node obtained by the first stage of search processing and the insertion key, a determination is made of into what node of the node pair to be inserted the leaf node holding the insertion key is to be stored.

For example, in the case in which "011011" is to be inserted into the coupled node tree of FIG. 2B, the index key resulting from the search is the "011010" that is stored in node 211d. A Boolean value is obtained by performing a value comparison between the insertion key "011011" and the index key "011010" stored in the node 211d, and, in this example, because the insertion key is larger, the Boolean value 1 is obtained, so that the leaf node that holds the insertion key is stored in an array element having an array element number obtained by adding 1 to the coupled node indicator of the node pair to be inserted. The index key "011010" is stored in an array element having an array element number obtained by adding the logical negation value of the Boolean value obtained by the value comparison to the coupled node indicator.

When this is done, because the index key "011010" and the insertion key "011011" differ at the 5th bit, the node 211d is a branch node, with a discrimination bit position of 5, whose coupled node indicator is the array element number of a primary node of the inserted node pair.

In the case also in which "011001" is to be inserted into the coupled node tree of FIG. 2B, the index key resulting from the search is "011010" that is stored in node 211d. In this case, because the insertion key is smaller, the Boolean value 0 is obtained, so that the leaf node that holds the insertion key is stored in an array element having an array element number obtained by adding 0 to the coupled node indicator of the node pair to be inserted. Then, because the index key "011010" and the insertion key "011001" differ at the 4th bit, the node 211d is a branch node with a discrimination bit position of 4, whose coupled node indicator is, the array element number of a primary node of the inserted node pair.

Next, processing proceeds to the processing of step S516 and thereafter in FIG. 5C. FIG. 5C is a drawing showing the processing flow of storing a node in the array prepared as described in FIG. 5B, determining the insertion position therein, and changing the contents of an existing node to complete to the insertion processing.

The processing from step S516 to step S523 is processing to determine the position on the coupled node tree for insertion of a node pair, and the processing of step S524 and thereafter is processing for setting data in each node and completing the insertion processing.

At step S516, an exclusive-OR, for example, is obtained of the insertion key and the index key obtained at step S510 so as to obtain a difference bit string. Proceeding to step S517, from the difference bit string obtained at step S516 the first bit position starting from the most-significant 0th bit at which there is a non-coincidence is obtained. This processing can be performed by, for example, a CPU having a priority encoder, the difference bit string being input thereto and the difference bit positions being obtained. It is alternatively possible to perform the equivalent processing using software, to obtain the first bit position at which there is non-coincidence.

Next, proceeding to step S518, a determination is made as to whether the stack pointer of the search path pointer is pointing at an array element number of the root node. If it is, processing proceeds to step S524, but if it is not processing proceeds to step S519a.

At step S519a, the stack pointer of the search path stack is decremented by 1, and the discrimination bit position stacked at that point is extracted. In the insertion processing proposed in a previous application, the Japanese Patent Application 2006-187872, since only the array element number is stored in the search path stack, the array element number has to be extracted, and then, from the array, the discrimination bit position has to be extracted from the node in which is stored the array element pointed to by the array element number, but since, in step S506a described in FIG. 5A in this invention the discrimination bit position is stored in the search path stack, the discrimination bit position can be extracted without accessing the array.

Next, proceeding to step S522, a judgment is made as to whether the discrimination bit position read out at step S519a is of higher order than the bit position obtained at step S517. In this case, the term higher order means more to the left in the bit string, that is, having a lower bit position value.

If the result of the judgment at step S522 is negative, return is made to step S518, and repetition is done until either the judgment at step S518 is affirmative or the judgment at step S522 is affirmative. When an affirmative judgment results at step S522, at step S523 the stack pointer search path stack is incremented by 1, and processing proceeds to the processing of step S524 and thereafter.

In the above-described processing at step S516 to step S523, in order to determine the position of insertion of a node pair, a bit string comparison is performed between the index key that is to be inserted and index key obtained by searching, and then a check is made of the relative positional relationship between the leading (most significant) bit position at which the bit value is different in the bit string comparison and the discrimination bit position of the branch node stored in the search path stack. The next branch node link target of the branch node at which the discrimination bit position is a more significant is made the insertion position for the node pair to be inserted.

For example, when inserting "111000" into the coupled node tree of FIG. 2B, the index key resulting from the search is the "101011" stored in the node 210h. A bit string comparison between the insertion key "111000" and the index key "101011" stored in the node 210h obtains the bit position 1 as the most significant bit position of a bit value that is different. The search path stack is successively traversed in reverse until the relative position relationship between the obtained bit position 1 and the discrimination bit position of the branch node stored in the array element having an array element number stored in the search path stack is such that the discrimination bit position is more significant, so that the root node 210a is reached. At that point the search path stack pointer is incremented by 1 to obtain the array element number of the node 211b. The insertion key "111000" is inserted into the link target of the node 211b.

If the root node is reached by traversing the search path stack in reverse but the discrimination bit position of the root node is not a bit position that is more significant than the bit position of the most significant bit having a different bit value in the previously determined bit string comparison, this is the case in which at the upper-order bit of the index key of the coupled node tree the bits that are more significant than the discrimination bit position of the root node all have equal values. This means that in the index key to be inserted, there is the first bit value that differs with the value of a bit that is more significant than the discrimination bit position of the root node. Therefore, the node pair to be inserted becomes the direct link target of the root node, and the discrimination bit position of the root node changes to the position of the most significant bit of the insertion key, which differs in value from the existing index key.

Next, the processing of step S524 and thereafter, which is the processing to set data at each node and complete the insertion processing, will be described. At step S524, the array element number that is pointed to by the stack pointer of the search path stack is extracted.

At step S525, 1 (leaf node) is stored in the node type of the array element pointed to by the array element number obtained at step S514 and the insertion key is stored in the index key. Proceeding to step S526, the array element at the array element number obtained at step S524 is read out from the array.

Next, at step S527, the contents read out at step S526 are stored in the array element having the array element number obtained at step S515. Finally, at step S528, 0 (branch node) is stored in the node type of the array element pointed to by the array element number obtained in step S524, the bit position obtained at step S517 is stored in the discrimination bit position, and the array element number obtained at the step S512 is stored in the coupled node indicator.

In the above-described example of inserting "111000" into the coupled node tree of FIG. 2B, the contents of node 211b are written into the node[0] of the empty node pair that has been obtained (step S527) and the node[1] thereof is made a leaf node that holds "111000" (step S525). The bit position 1 of the most significant bit that is the bit value that differs in the bit string comparison is stored in the discrimination bit position of the node 211b, and the array element number of the array element stored in the primary node of the obtained node pair is stored into the coupled node indicator (step S528).

Figure 6:
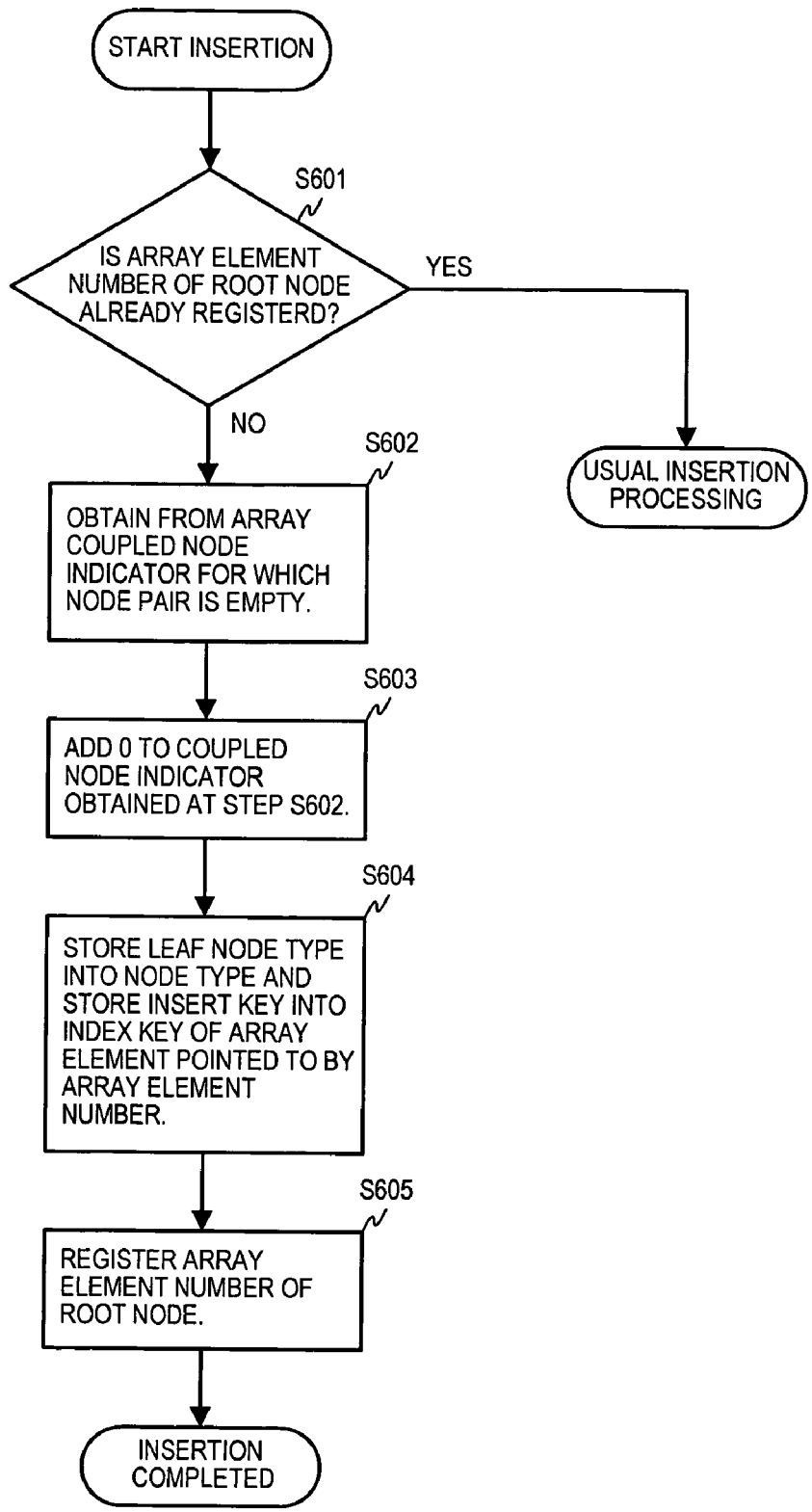
FIG. 6 is a processing flow diagram describing the overall node insertion processing for a case in which an index key is added, including root node insertion processing, in an embodiment of the present invention.

FIG. 6 is a processing flowchart describing the overall node insertion processing for the case of adding an index key, including insertion of a root node, as proposed in the Japanese Patent Application 2006-187827 by the present applicant.

At step S601, a judgment is made as to whether the array element number of a root node of a coupled node tree that is to be obtained as already been registered. If it has already been registered, the usual insertion processing described using FIG. 5A to FIG. 5C is performed.

At step S601, if the judgment is that the registration has not yet been done, this is the case of the generation and registration of a completely new coupled node tree. First, at step S602, an empty node pair is requested from the array, and the array element number of the array element to be made the primary node of the node pair is acquired. Next at step S603, the array element number is determined by adding 0 to the array element number obtained at step S602. (In actuality, this is equal to the array element number obtained at step S602). Further, at step S604, 1 (leaf node) is stored in the node type of the root node of the array element having the array element number obtained at step S603, and the insertion key is stored in the index key, and at step S605 the processing is completed by registering the array element number of the root node obtained at step S602.

As described above, it will be understood that when there is a set of index keys, the index keys are successively extracted therefrom, and the processing of FIG. 6 and FIG. 5A to FIG. 5C is repeated so as to enable the creation of a coupled node tree according to the present invention corresponding to the set of index keys.

Next, referring to FIG. 7A and FIG. 7B, the processing flow will be described for deleting a specific index key from a set of index keys associated with a coupled node tree, as proposed in the Japanese Patent Application 2006-187872 by the present applicant.

Figure 7A:
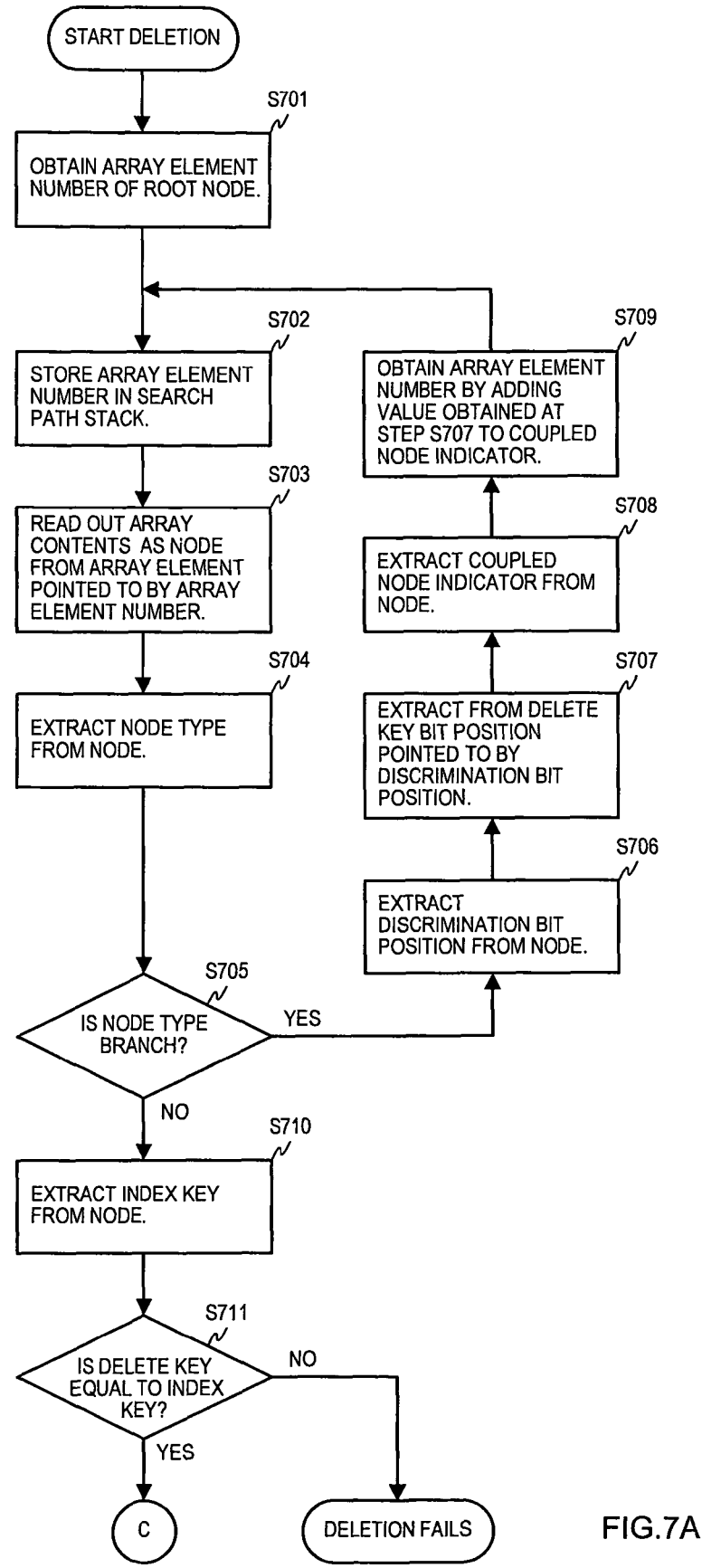
FIG. 7A is a flowchart showing the searching processing flow, which is the beginning stage of deletion processing.

FIG. 7A is a drawing showing the processing flow for search processing, which is the first stage of deletion processing, this corresponding to the using of a deletion key as the search key in the searching processing described in FIG. 4A, although the processing to store the discrimination bit position in the search path stack of step S406a in FIG. 4A is omitted. If the discrimination bit position derived from the history of the search process that is the first stage of deletion processing is to be used frequently and successively, then processing should be added to store the discrimination bit position in the search path stack. Because the processing of step S901 to step S910 corresponds completely to step S401 to step S410 of FIG. 4, these steps will not be described herein.

At step S701, if the search start node in step S401 of FIG. 4A is assumed to be the root node, the processing of step S702 to step S910 corresponds completely to step S402 to step S410 of FIG. 4A, with the exception of the above assumption, these steps will not be described herein.

In step S711 in FIG. 7A, a comparison is performed between the deletion key and the index key and, because if there is no equality the index key to be deleted does not exist in the coupled node tree, the deletion fails, and processing ends. If, however, there is equality, processing proceeds to step S712 and thereafter in FIG. 7B.

Figure 7B:
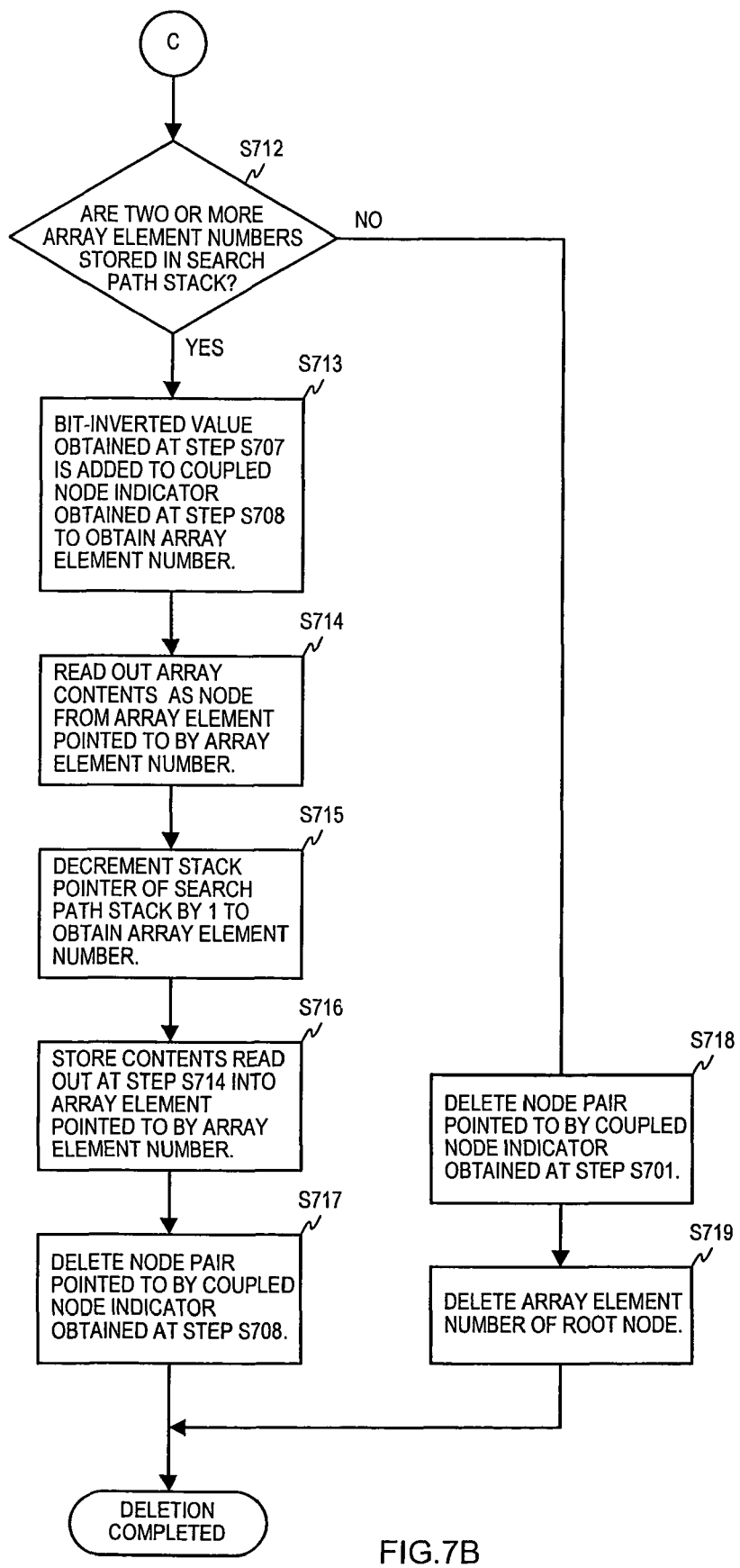
FIG. 7B is a drawing describing the processing flow that is the latter stage of the deletion processing.

FIG. 7B is a drawing describing the processing flow of the latter stage of the deletion processing. First, at step S712, a judgment is made as to whether or not there are at least 2 array element numbers on the search path stack. Stated differently, the condition in which there are fewer than 2 array element numbers is the one in which there is only 1, this being the array element number of the array element in which the root node is stored. In this case, processing proceeds to step S718, at which the node pair of the array element number of the root node obtained at step S701 is deleted. Next, proceeding to step S719, the array element number of the root node that had been registered is deleted, thereby completing the processing.

If at step S712 the judgment is made that there are two or more array element numbers stored in the search path stack, processing proceeds to step S713, at which an array element number is obtained by adding the inversion of the value obtained at step S707 to the coupled node indicator obtained at step S708. This processing is performed to determine the array element number of a node that forms a pair with a leaf node at which is stored the index key to be deleted.

Next, at step S714, the contents of the array element having the array element number obtained at step S713 are read out, and at step S715 the stack pointer of the search path stack is decremented by 1 and the array element number is extracted.

Next, at step S716, the contents of the array element read out at step S714 are written over the array element having the array element number obtained at step S715. This processing replaces the branch node that is the link source to the leaf node in which the index key to be deleted with the above-noted node that forms a pair with the leaf node.

Finally, at step S717, processing is completed by deleting the node associated with the coupled node indicator obtained in step S708.

Figure 8:
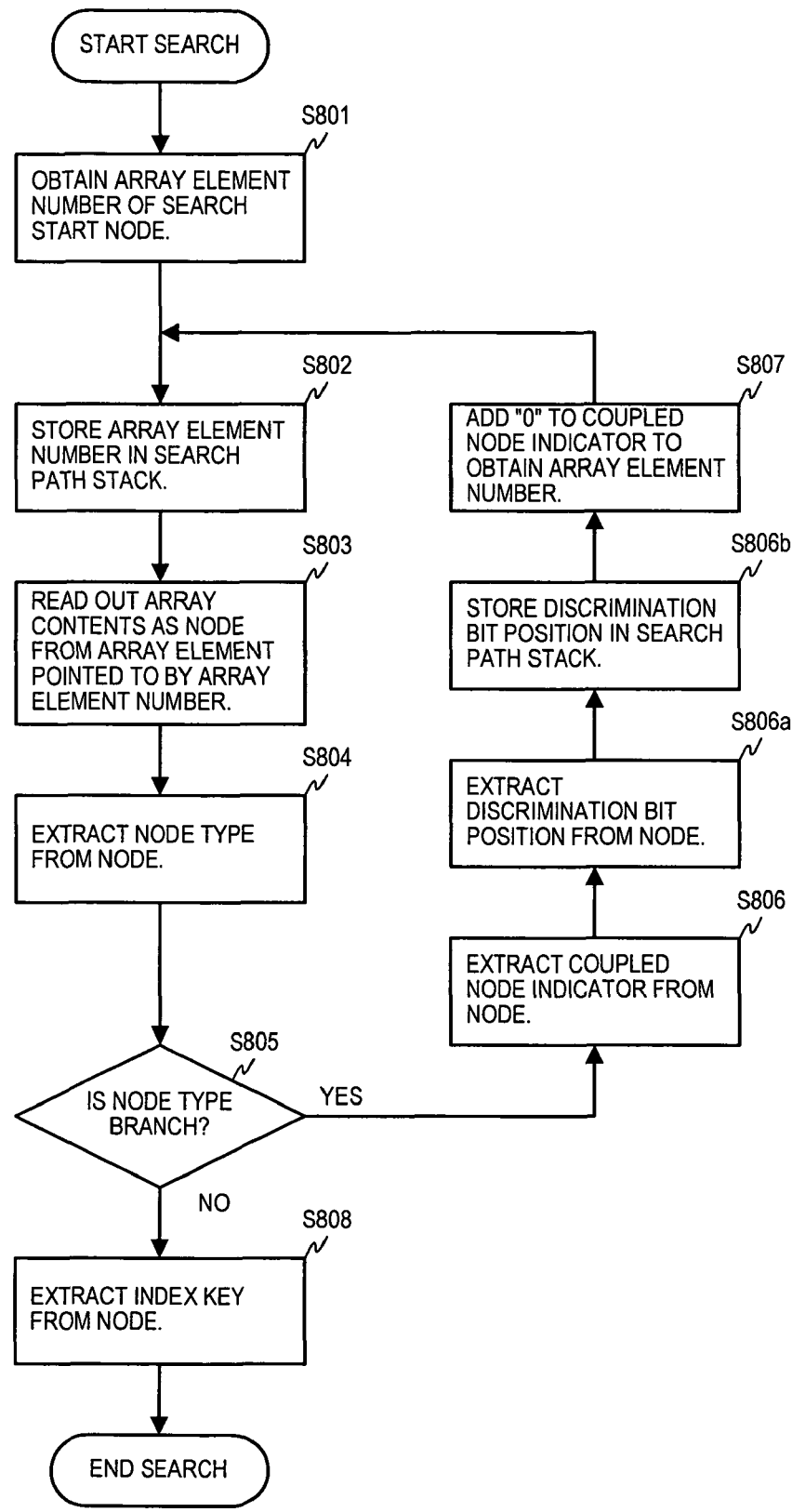
FIG. 8 is a flowchart showing the processing to obtain the minimum index key value stored in a coupled node tree.

FIG. 8 is a flowchart describing the processing to obtain the minimum value of the index keys stored in a coupled node tree (including subtrees) according to this invention. The flowchart in FIG. 8 is the flowchart for obtaining the minimum value of the index keys proposed in Japanese Patent Application 2006-293619, previously filed by the applicant of the present invention, with processing added for extracting discrimination bit positions from the nodes and storing them in the search path stack.

From the disposition of index keys on the tree as described above, the processing to determine the minimum value of index key corresponds to traversing node [0] from the search start node until reaching the leaf node.

First, from the obtaining of the array element number of the search start node at step S801 until the node type determination at step S805 is similar to the processing from step S401 to step S405 of FIG. 4.

If the node type is determined to be branch node at the node type determination made at step S805, processing proceeds to step S806, at which the coupled node indicator is extracted from the node. Next processing proceeds to step S806a where the discrimination bit position is extracted from the node and, in step S806b, that extracted discrimination bit position is stored in the search path stack.

Next, at step S807, the value "0" is added to the extracted coupled node indicator and taken as the new array element number, after which return is made to step S802. Thereafter, the processing from step S802 to step S807 is repeated until the node is determined to be leaf node at step S805, and at step S808 the index key is extracted from the leaf node, at which time processing ends.

In the above-noted processing described in FIG. 8, in order to traverse the node [0], "0" is always added to the coupled node indicator. That is, according to the processing of FIG. 8, the node of a link target is always taken as the node [0] of a node pair, and branching is done to the node storing the index key with the smaller value. By doing this, the tree structure enables extraction of the minimum index key of the coupled node tree, which is a sequentially configured as described above.

Figure 9:
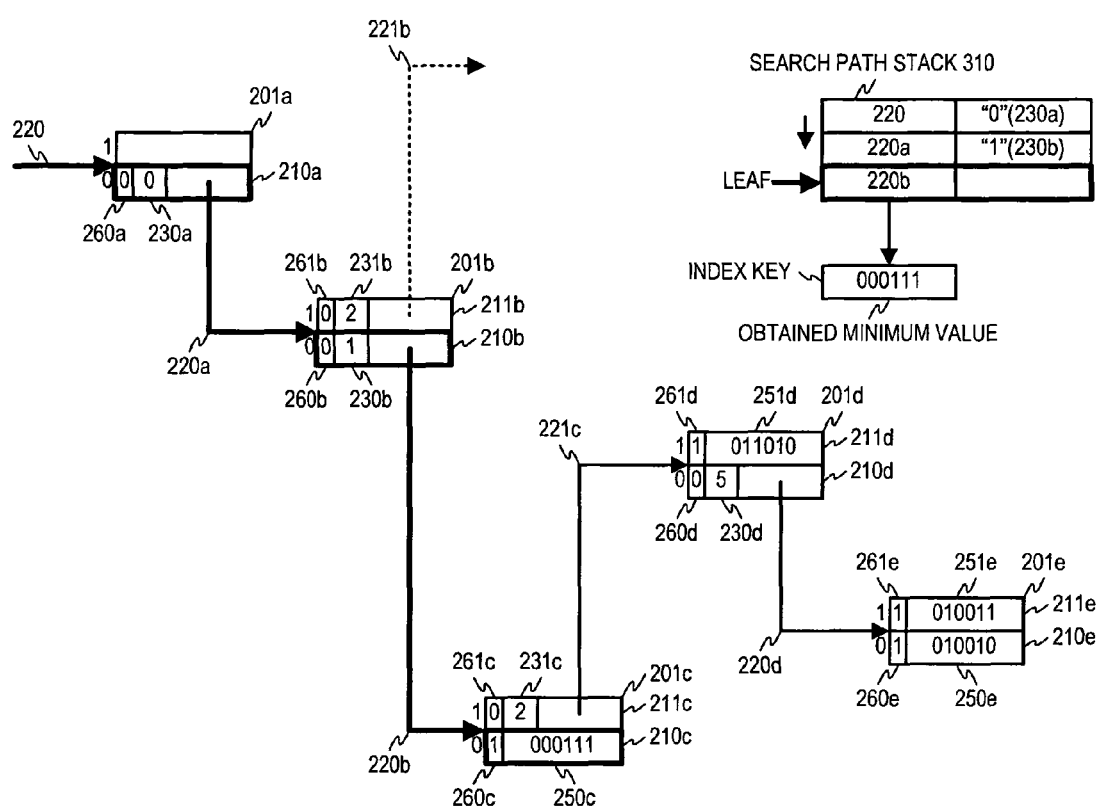
FIG. 9 is a drawing describing the processing to obtain the minimum index key value using a coupled node tree in an embodiment of the present invention.

FIG. 9 is a drawing explaining the processing, described in the flowchart of FIG. 8, to obtain the minimum value of an index key from a coupled node tree embodiment exemplified in FIG. 2B. FIG. 9 shows the status of the search path stack 310 and the array element number read out when node 210a of array element number 220 is taken as the search start node Since the search start node is node 210a, that array element number 220 and the bit value "0" of the discrimination bit position 230a are pushed into the search path stack 310, next linking is done to node 210b, which is the node[0] of the node pair 201b pointed by the coupled node indicator 220a, and that primary node indictor 220a and the bit value "1" of the discrimination bit position 230b are pushed into the search path stack 310, and finally leaf node 210c is reached. The index key "000111" of the leaf node 210c is extracted, and processing is terminated.

As was described above, the array element numbers of the node [0] of the node pair and the discrimination bit position of the branch nodes are successively pushed into search path stack 310.

Figure 10:
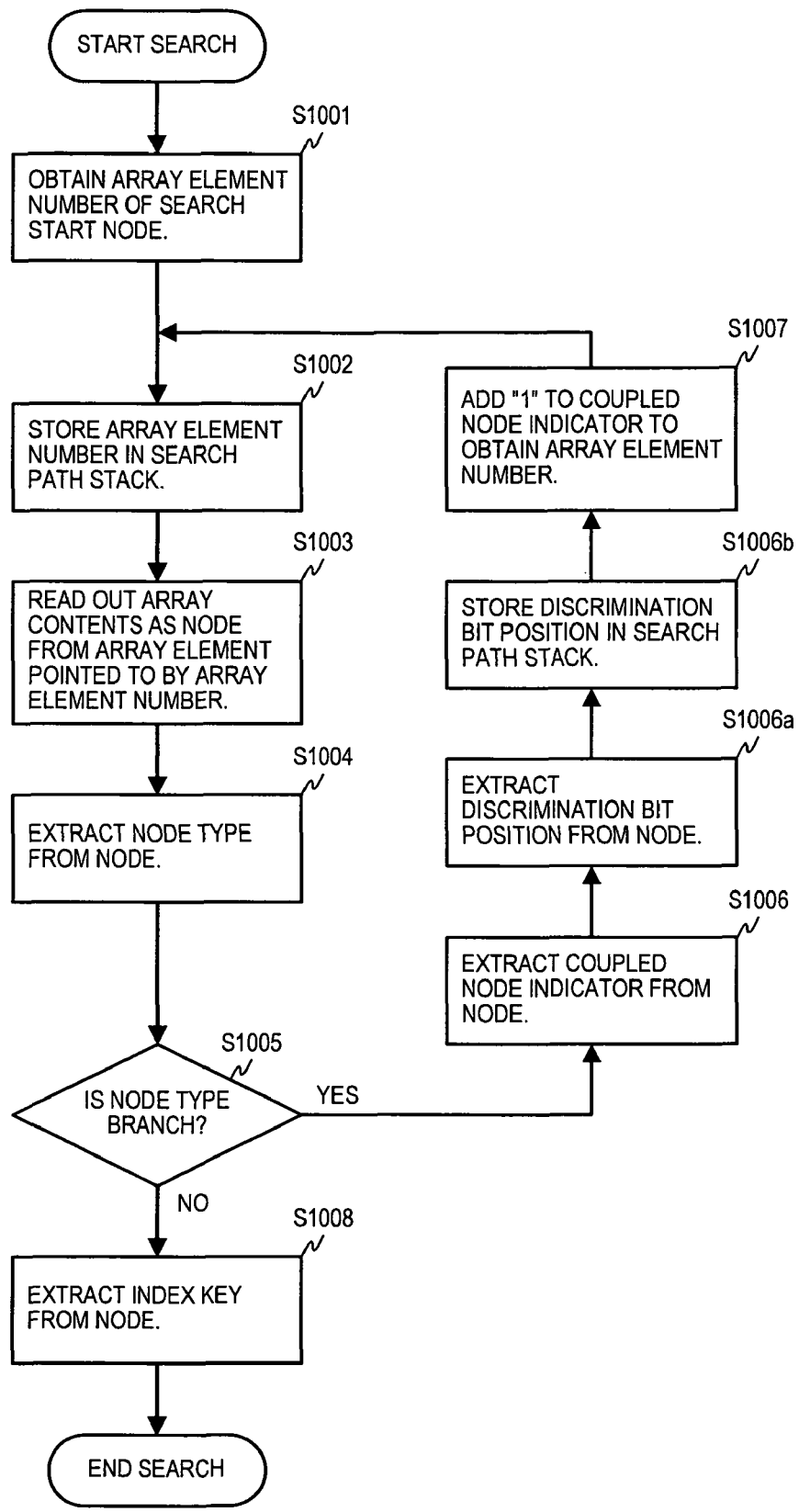
FIG. 10 is a flowchart showing the processing to obtain the maximum index key value stored in a coupled node tree.

FIG. 10 is a flowchart showing the processing to obtain the maximum value for the index keys stored in a coupled node tree (including a subtree). The flowchart in FIG. 10 is the flowchart for obtaining the maximum value of the index keys proposed in Japanese Patent Application 2006-293619, previously filed by the applicant of the present invention, with processing added for extracting discrimination bit positions from the nodes and storing them in the search path stack.

The processing to determine the maximum index key value corresponds to sequentially traversing up until a leaf node, with regard to the node [1] of the nodes of the tree. The processing for determining the maximum index key of an arbitrary subtree is described below, with a comparison being made to the determining of the minimum index key, focusing on the points of difference therebetween.

Of the processing sequence described in FIG. 10, the processing from step S1001 to step S1006b and that of step S1008 corresponds, respectively to, and performs similar processing as, the processing from step S801 to step S806b and that of step S808 in FIG. 8. The difference with respect to the processing in FIG. 8 for determination of the minimum value is that, at step S1007, the value "1" is added to the coupled node indicator. By doing this, linking is always done to the node [1] of a node pair expressed by the coupled node indicator, and by repeating the processing successively from step S1002 to step S1007, it is possible to obtain the maximum value of the index key.

Figure 11:
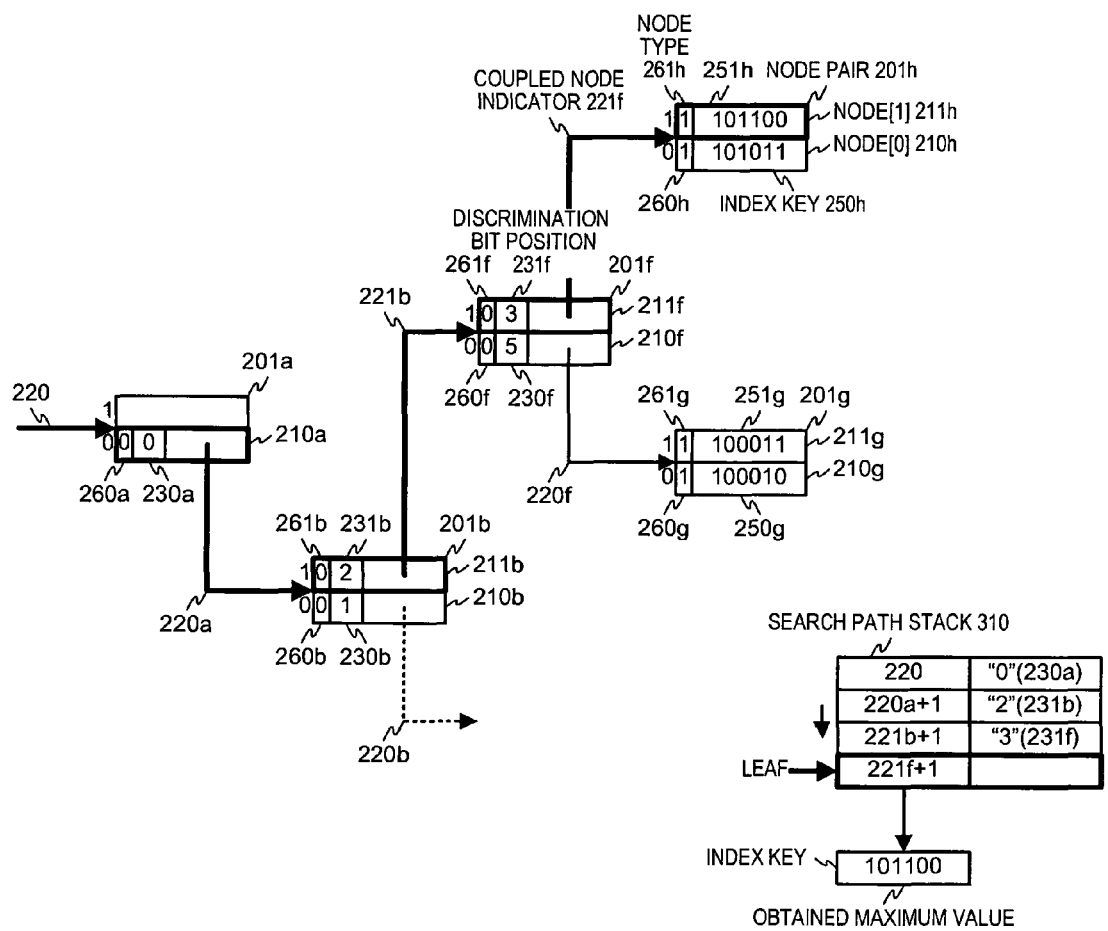
FIG. 11 is a drawing describing the processing to obtain the maximum index key value using a coupled node tree in an embodiment of the present invention.

FIG. 11 is a drawing describing the processing to obtain a maximum value of the index key described in the flowchart of FIG. 10 based on the coupled node tree embodiment exemplified in FIG. 2B. As described in FIG. 11, the search start node is the node 210a with the array element number 220, just as in the example of FIG. 9. Thus, the array element number of the search start node is array element number 220 and the array element number 220 is pushed onto the search path stack 310. The node 210a stored in the array element with the array element number 220 is read out. Since the node type 260a of node 210a is "0" and thus a branch, the coupled node indicator 210a and the discrimination bit position 230a are obtained and the value "0" of discrimination bit position 230a is stored in the search path stack 310.

Next, because the search for maximum value always takes the node[1] link, the value obtained by adding "1" to the coupled node indicator 220a is taken as the array element number and links to node 211b. Then array element number 220a+1 is stored in the search path stack and node 211b is read out.

Since the node type 261b of node 211b is "0" and thus a branch, the coupled node indicator 221b and the discrimination bit position 231b are obtained and the value "2" of discrimination bit position 231b is stored in the search path stack 310.

Next the value obtained by adding "1" to the coupled node indicator 221b is taken as the array element number and links to node 211f. Then array element number 221b+1 is stored in the search path stack and node 211f is read out.

Since the node type 261f of node 211f is "0" and thus a branch, the coupled node indicator 221f and the discrimination bit position 231f are obtained and the value "3" of discrimination bit position 231f is stored in the search path stack 310.

Next the value obtained by adding "1" to the coupled node indicator 221f is taken as the array element number and links to node 211h. Then array element number 221f+1 is stored in the search path stack and node 211h is read out.

Since the node type 261h of node 211h is "1" and thus a leaf, the value of the index key 251h is extracted from node 211h as the maximum value, at which time processing ends.

As described in FIG. 4A to FIG. 11, when executing the basic operation of searching for an index key that coincides with a search key and search processing for the minimum/maximum value of the index keys, the array element numbers and the discrimination bit position of branch nodes of the array elements referred to are successively stored in the search path stack 310.

Also, in the search processing for the minimum/maximum value of the index keys referencing FIG. 8 and FIG. 10, although the example used is that of the coupled node tree being stored in an array, it is not essential that the coupled node tree be stored in an array, it being clear that it is possible to search for the minimum/maximum value of an index key by linking to only the primary node of the two nodes forming a node pair or to only the node located in a memory area adjacent thereto of the two nodes forming the node pair in order to reach a leaf node.

Next, the method of splitting or conjoining a coupled node tree of the present invention is described below. Splitting of a coupled node tree is done when a split key formed by a given bit string is specified, the relative value relationship between the index keys included in the coupled node tree and the split key being used to perform splitting into two groups, thereby generating two coupled node trees formed by index keys that belong to each of the groups.

With regard to splitting by value relationship, although in the description that follows hereunder splitting is done into a group that is larger than the split key and a group that is smaller than or equal to the split key, even in the case in which splitting is done into a group that is larger than or equal to the split key and a group that is smaller than the split key, splitting/conjoining can be done in the same manner, as can be easily understood from the following description.

That is, the split key is a key used to establish where the coupled node tree is to be split. The conjoining of coupled node trees is the generation of a coupled node tree corresponding to the union of two sets of index keys from two coupled node trees corresponding to the two index key sets. In the present invention, it is assumed that the product set of the two sets of index keys is an empty set. In the description that follows, a coupled node tree is sometimes referred to simply as a tree.

Figure 12:
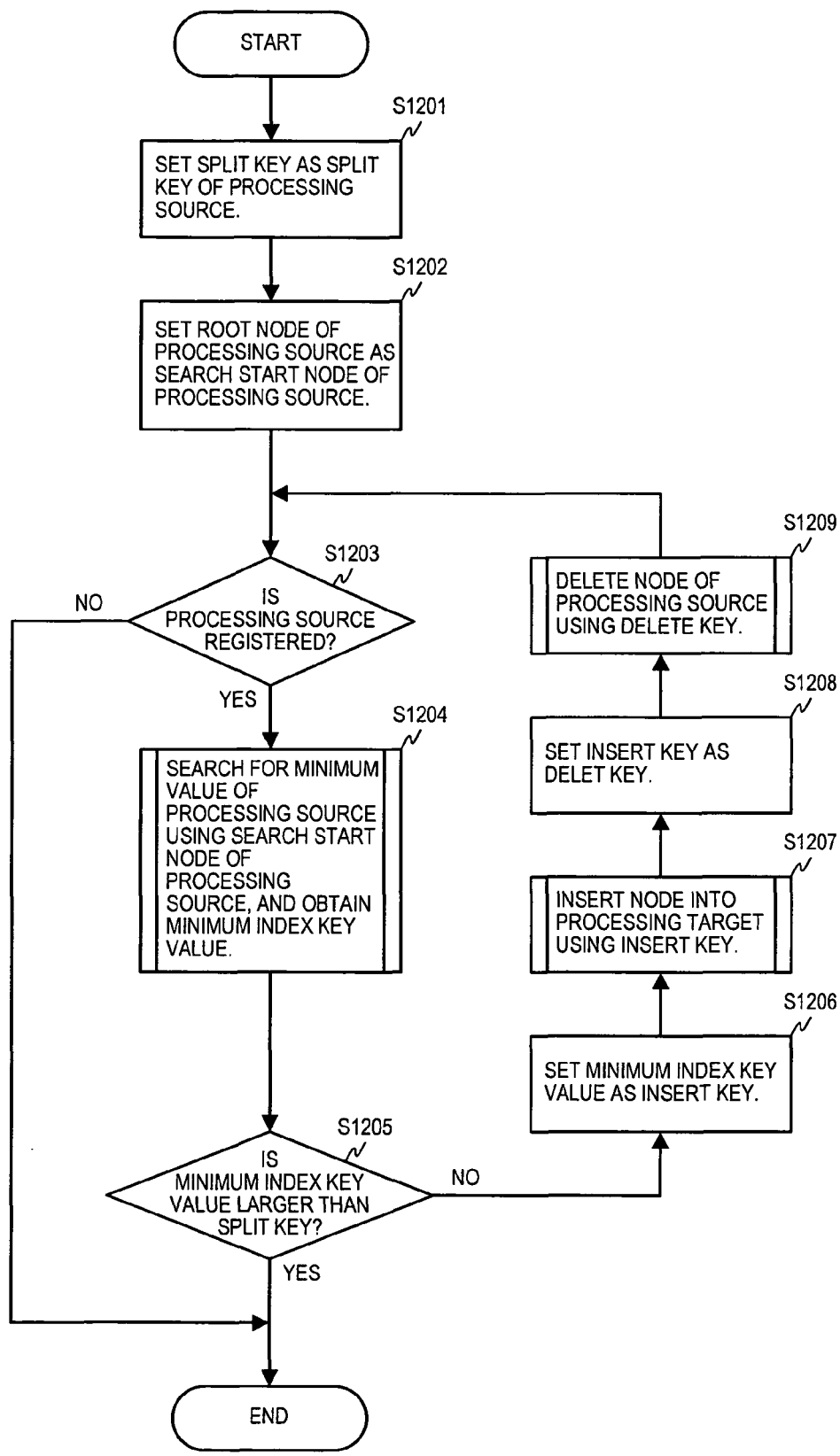
FIG. 12 is a flowchart describing the splitting processing flow for a coupled node tree in the first embodiment.

FIG. 12 is a drawing describing the splitting processing flow for a coupled node tree in the first embodiment of the present invention. The step configuration of the flow described in FIG. 12 is similar to the processing flow in the first embodiment of the splitting processing proposed in Japanese Patent Application 2006-319407, previously filed by the applicant of the present invention, but there are some differences in the content of the steps.

The first embodiment of the present invention is one in which the minimum index key value in the processing source tree (herein sometimes referred to simply as the processing source) that is to be split is extracted, the extracted minimum index key value is inserted into the processing target tree (sometimes referred to simply as the processing target) generated by splitting the processing source and processing to delete the minimum index key value from the processing source tree is performed repeatedly as long as the minimum value is equal to or less than the split key, to split the processing target from the processing source tree that is to be split.

At the first step, step S1201, the specified split key is set as the split key for the processing source. The specification of the split key can be made by external input by an operator, and can also be made as a result of processing by a computer program, or by a remotely issued command. The specified split key is set into an area in memory for holding the split key in the processing source.

Next, at step S1202 the root node of the processing source is set as the search start node in the processing source and processing proceeds to step S1203. At step S1203, a determination is made as to whether or not the processing source tree is registered. If the result of the determination is that the processing source tree is not registered, this means that the entire processing source tree has been deleted. So, this is an exceptional case in which the split key is equal to or larger than the maximum index key value in the processing source tree, in which case processing is ended.

If the processing source tree is registered, processing proceeds to step S1204, at which the processing described in FIG. 8 is executed from the root node that is set as the search start node at step S1202 to obtain the minimum index key value. At this time, as explained above, the array element numbers and the discrimination bit position of branch nodes of the array elements referred to are stored in the search path stack.

Next, proceeding to step S1205, a determination is made as to whether or not the minimum value obtained at step S1204 is larger than the split key. If the minimum value is larger than the split key, because the tree splitting has been completed, the processing is ended. If it is not larger, however, the generation of a processing target tree and deletion of the node from the processing source tree are executed by step S1206 to step S1209 described below, and return is made to step S1203.

At step S1206, the minimum value obtained at step S1204 is set as the insertion key of the processing target. Next, at step 1207, the generation of the processing target tree by the insertion key is executed by the tree generation and insertion processing described in FIG. 5A to FIG. 5C and in FIG. 6.

Since the generation and insertion processing of the splitting processing of the first embodiment of the coupled node tree in this invention can reference the discrimination bit position stored in the search path stack during the previous maximum value search processing, the processing can be faster than the splitting processing in the first embodiment proposed in Japanese Patent Application 2006-319407, previously filed by the applicant of the present invention.

Then, at step S1208, the insertion key in step S1207 is set as the deletion key of the processing source, and at step S1209 the deletion processing described in FIG. 7A and FIG. 7B deletes the leaf node that includes the deletion key from the processing source tree.

Although, in the above description of splitting processing, deletion is done successively from the minimum index key of the processing source, it will be clearly understood by a person skilled in the art that it is possible to perform successive deletion from the maximum value of the index key in the same manner. In this case, step S1204 is processing for determining the maximum value of the index key, step S1205 is processing to determine the value relationship between the maximum value and the split key, and at step S1206 the maximum value is set as the insertion key of the processing target.

Although the foregoing is a description of splitting processing, it is possible to execute conjoining processing as well by the processing flow described in FIG. 12. Taking one of two trees to be conjoined as the processing source tree, if the split key is taken as equal to or larger than the maximum index key value in the processing source tree, conjoining processing corresponds to the exceptional processing described above, in which the processing source tree is deleted and conjoined to the processing target tree. In the case in which the maximum index key value in the processing source tree is unknown, the split key is determined beforehand by the maximum value search processing described in FIG. 10.

Because the split key is taken to be equal to or larger than the maximum index key value in the processing source tree, in the value relationship comparison of step S1205, because there is branching to step S1206 because the split key is always larger than the minimum value, it is possible to omit step S1205. If that is the case, because there is no meaning to setting the split key, the result is that step S1201 is also unnecessary, and it is possible to perform conjoining processing by simply repeating the search for the minimum value and the insertion and deletion processing.

As noted with regard to splitting processing, it is clear that conjoining processing can be performed in the same manner by repeating the search for the maximum value and the insertion and deletion processing.

Figure 13:
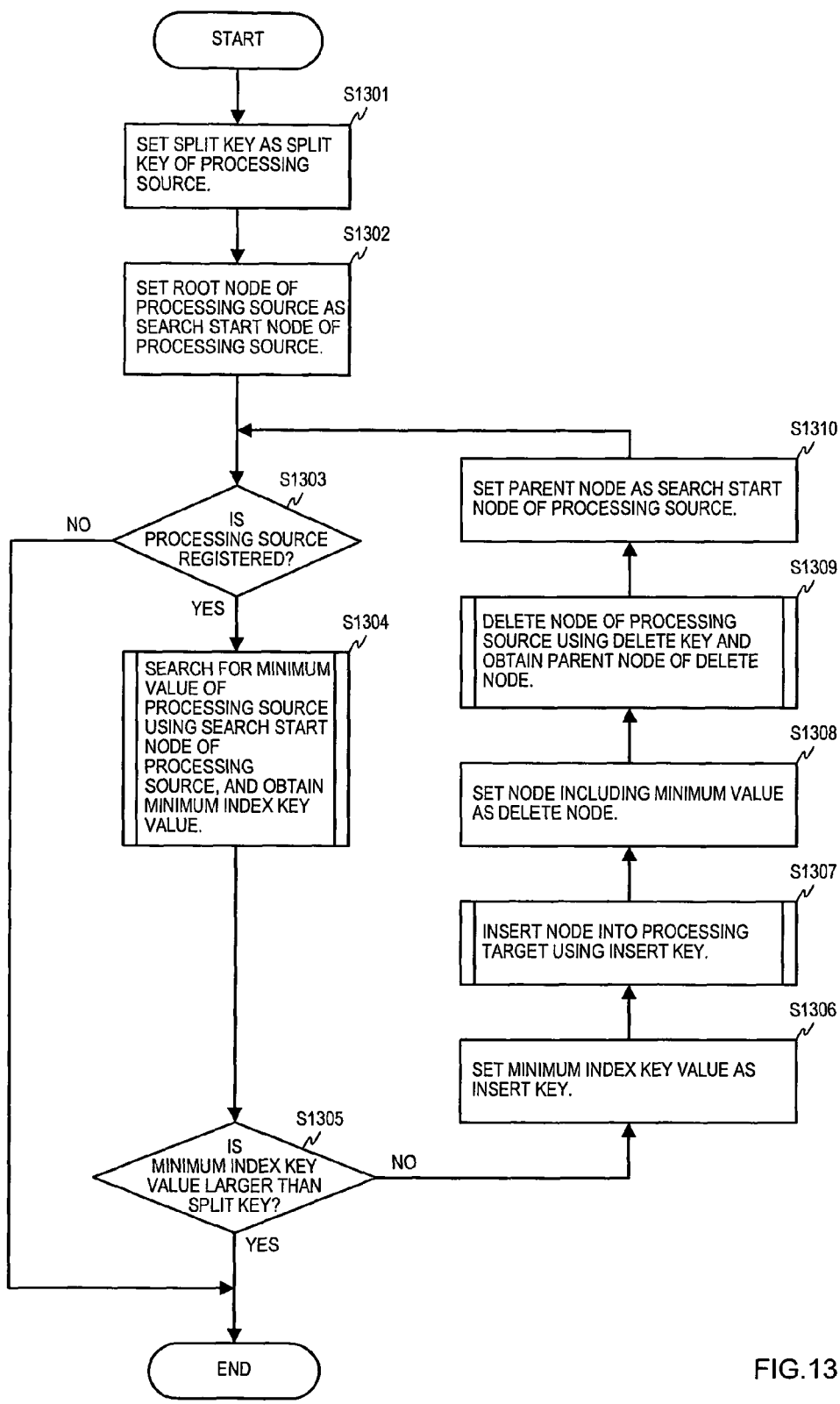
FIG. 13 is a flowchart describing the splitting processing flow for a coupled node tree in the second embodiment.

FIG. 13 describes the processing flow for splitting of a coupled node tree in the second embodiment of the present invention. The step configuration of the flow described in FIG. 13 is similar to the processing flow in the second embodiment of the splitting processing proposed in Japanese Patent Application 2006-319407, previously filed by the applicant of the present invention, but there are some differences in the content of the steps.

Although the second embodiment of the present invention is similar to the first embodiment in that insertion and deletion are done in index key units, a search path stack is used in searching for an index key to be inserted/deleted, so as to reduce the number of runtime processing steps when executing insertion processing and deletion processing.

Because the processing from step S1301 to step S1306 in FIG. 13 is exactly the same as the processing from step S1201 to step S1206 of the first embodiment described in FIG. 12, the explanation thereof is omitted. And in the minimum value search processing of step S1304, the action of storing the array element number and discrimination bit position in the search path stack is the same as the minimum value search processing in step S1204.

At step S1307, a node is inserted into the processing target using the insert key. This processing is characteristic of this embodiment, which differs from the insertion processing of step S1207 described in FIG. 12, and is described below, with reference made to FIG. 14, FIG. 15A, and FIG. 15B.

Next, at step S1308, the node that includes the minimum value obtained at step S1304 is set as the deletion node of the processing source, and at step S1309 the deletion node is deleted from the processing source, thereby obtaining a parent node of the processing source into which the contents of the node that forms a node pair with the deletion node are copied.

Next, at step S1310, the parent node of the processing source obtained at step S1309 is set as the search start node of the processing source, and return is made to step S1303. As will be described below, the parent node of the processing source is a branch node that is positioned at the immediately next higher order position from the deletion node. The deletion node includes the minimum value of the index key of the processing source, and from the above-noted sequence of the index keys, the next minimum value to be searched for is lower in order than the parent node of the processing source.

Therefore, by using the parent node of the processing source in place of the root node as the search start node for the minimum value search on second and subsequent times of step S1304, it is possible to reduce the number of processing steps.

Figure 14:
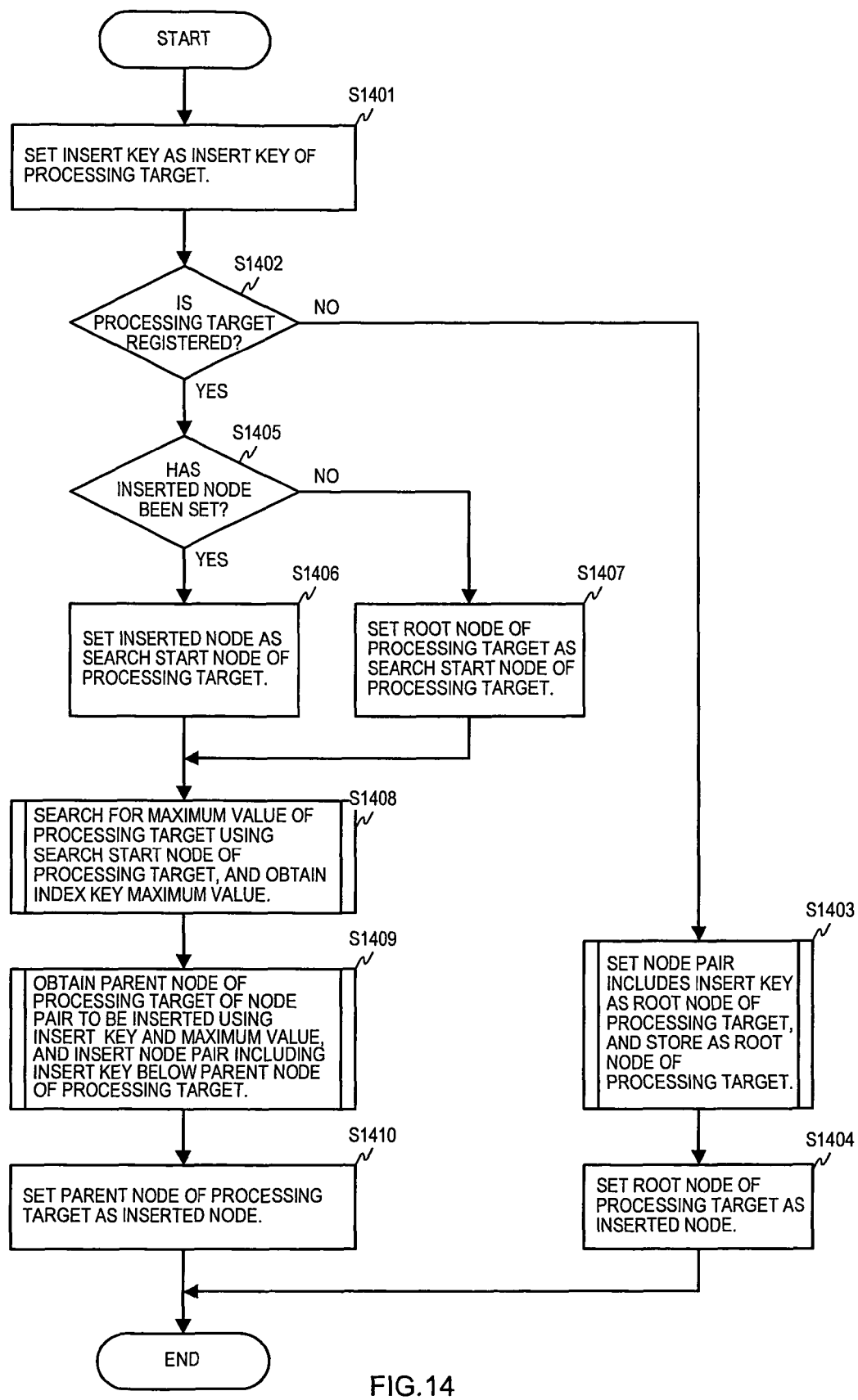
FIG. 14 is a flowchart describing the processing flow for insertion of a node in the second embodiment.

Step S1308 to step S1309 and the parent node of the processing source will be described later, with reference made to FIG. 16. FIG. 14 is a drawing describing the insertion processing flow for a node, corresponding to step S1306 and step S1307 described in FIG. 13.

The first step, step 1401, which is a step of setting the index key as the insertion key of the processing target, is processing corresponding to step S1306 described in FIG. 13, the minimum value obtained at step S1304 being set into a processing target insertion key setting area.

Next, at step S1402, a determination is made as to whether or not the processing target is registered. In the case in which the processing target is not registered, processing proceeds to step S1403, at which the node pair that includes the insertion key as the root node of the processing target is set, registering the root node of the processing target. Proceeding to step S1404, the root node of the processing target is set as the inserted node, and processing is ended.

If the result of the above-noted step S1402 is that registration has been done, processing proceeds to step S1405. At step S1405, a determination is made as to whether or not the inserted node has been set. This determination processing is required for the tree conjoining processing to be described later. In tree splitting processing, because at the time of the first insertion processing the root node is set as the inserted node at step S1404, the determination result at step S1406 is always "yes." Therefore, if this is only for splitting processing, step S1405 and step S1407 are not essential.

If the result of the determination at step S1405 is "yes," processing proceeds to step S1406, at which the node that is set as the inserted node is set as the search start node of the processing target, and processing proceeds to step S1408.

If the result of the determination as step S1405 is "no," processing proceeds to step S1407, at which the root node is set as the search start node of the processing target, and processing proceeds to step S1408. At step S1408, the maximum value search processing described in FIG. 10 is used to obtain the maximum value of the index key of the processing target from the search start node set at either step S1406 or step S1407. At this time, as was explained above, the array element numbers and the discrimination bit positions are stored in the search path stack.

Next, at step S1409, the insertion key set at step S1401 and the maximum value obtained at step S1407 are used to determine the parent node of the processing target of the node pair to be inserted, and the node pair including the insertion key is inserted below the parent node.

Proceeding to step S1410, the parent node of the processing target below which the node pair including the insertion key in step S1409 is inserted is set as the inserted node and processing is ended. Next, the above noted step S1403 and step S1409 are described in detail below.

Figure 15A:
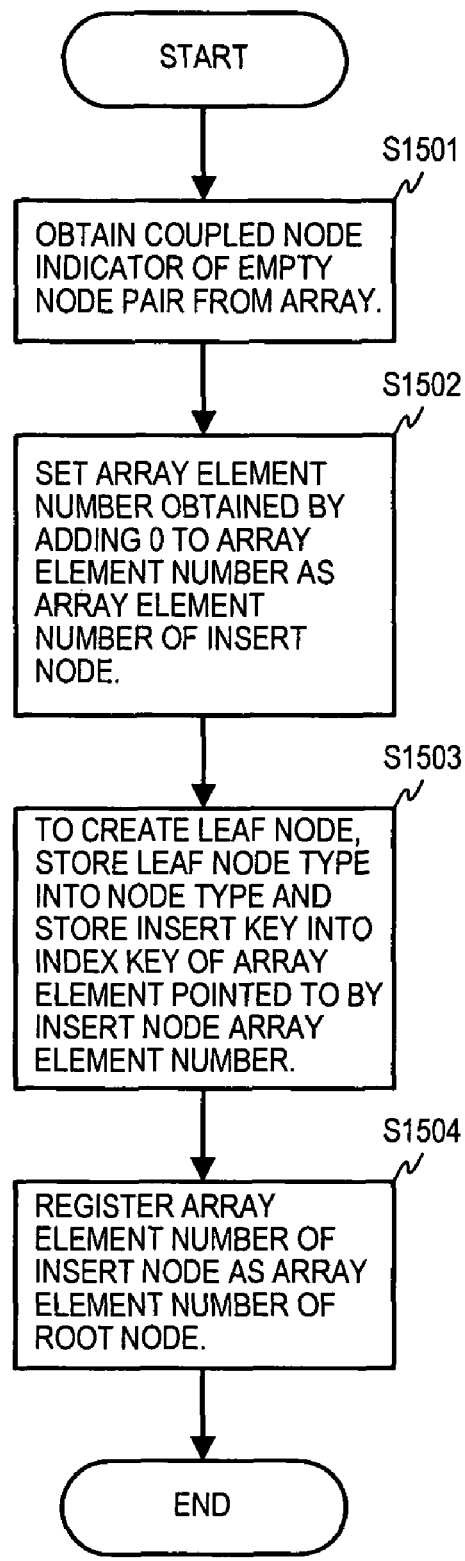
FIG. 15A is a flowchart describing the root node setting processing in the second embodiment.

FIG. 15A is a flowchart describing the root node setting processing of step S1403 described in FIG. 14. First, at step S1501, the coupled node indicator of an empty node pair is obtained from the array.

Next, at step S1502, the array element number obtained by adding "0" to the coupled node indicator obtained at step S1501 is set as the array element number of the insertion node. Proceeding to step S1503, in order to form a leaf node the node type is set to leaf and the index key is set to the insertion key, and storage is done into the array element having the array element number set at step S1502.

Next, at step S1504, the array element number of the insertion node is registered as the array element number of the root node, and processing is ended. The processing from step S1501 to step S1504 corresponds to the steps S602 to S605 for the case in which, in generating a coupled node tree described with reference to FIG. 6, the array element number of the root node has not been registered.

Figure 15B:
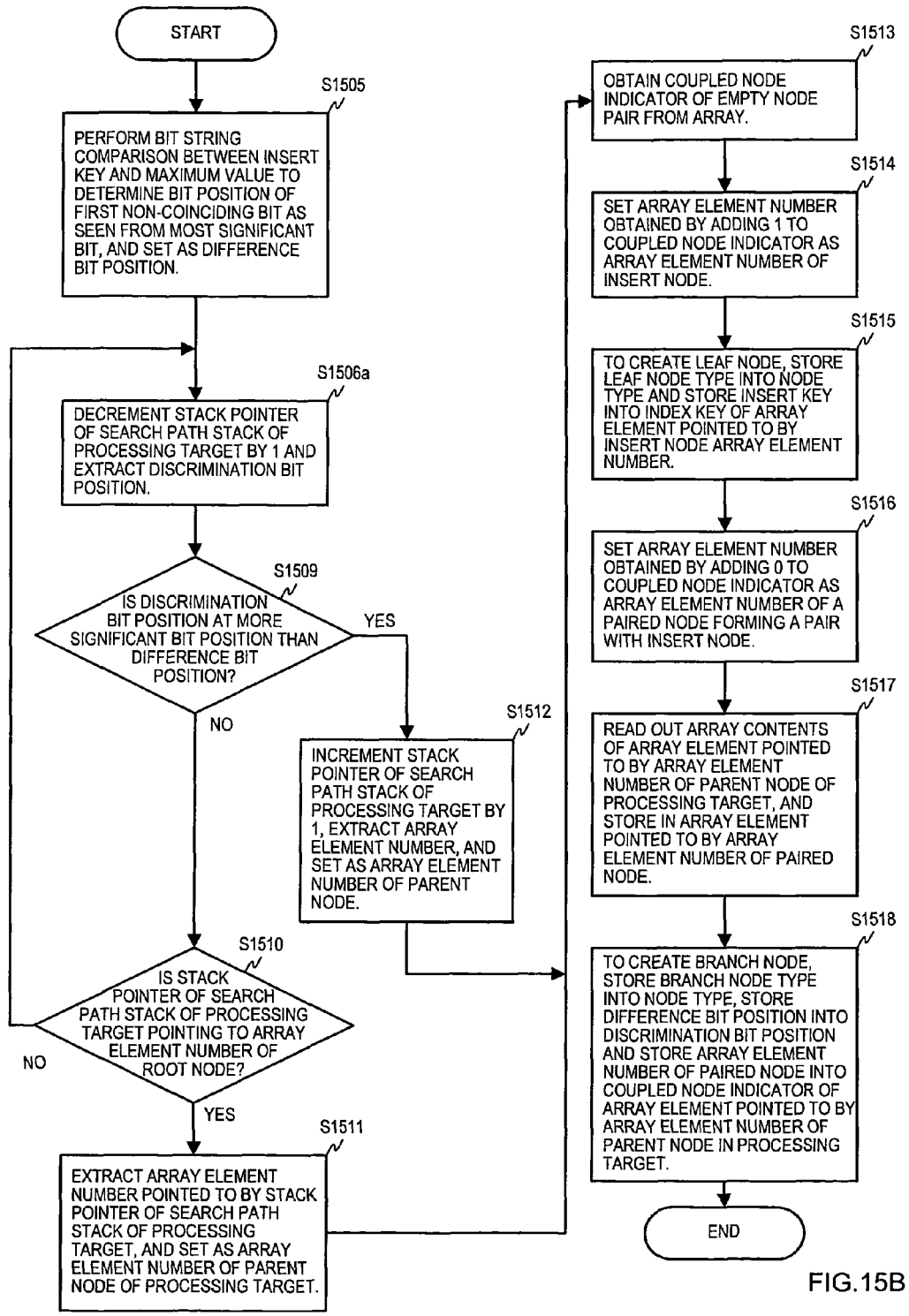
FIG. 15B is a flowchart describing the processing flow for inserting a node pair including an insertion key, into the parent node in the second embodiment.

FIG. 15B is a flowchart describing the processing for determining the parent node of the processing target, below which a node pair is to be inserted and inserting a node pair including the insertion key below the parent node. The flow described in FIG. 15B is an application of the insertion processing proposed in Japanese Patent Application 2006-187872, previously filed by the applicant of the present invention, and the processing at step S1505 of comparing the insertion key and the maximum value as bit strings and determining the position of the first non-coinciding bit as seen from the most significant, 0th, bit, and the processing of setting the determined position into the area for storage of the difference bit position correspond to the processing of step S516 and step S517 described in FIG. 5C.

After step S1505 processing proceeds to step S1506a. The processing from step S1506a to step S1512 corresponds to that of step S519a to step S523 described in FIG. 5C, and the processing from step S1513 to step S1518 corresponds to that of step S524 to S528 described in FIG. 5C.

At step S1506a, the stack pointer of the search path stack of the processing target of the maximum value search described in step S1408 of FIG. 14 is decremented by 1 and the discrimination bit position is extracted.

Continuing to step S1509, a comparison is performed between the difference bit position set at step S1505 and the discrimination bit position extracted at step S1508 to determine whether or not the discrimination bit position is a more significant position than the difference bit position.

As a result of this determination, if the discrimination bit position is of higher order than the difference bit position, processing proceeds to step S1512, at which the stack pointer of the search path stack of the processing target is incremented by 1 and the array element number is read out, this being set into the parent node array element number area, after which processing proceeds to step S1513.

If, however, the result of the determination at step S1509 is that the discrimination bit position is not a more significant bit position than the difference bit position, processing proceeds to step S1510. At step S1510, a determination is made as to whether or not the stack pointer of the search path stack of the processing target is pointing to the array element number of the root node.

If the result of the determination is that the stack pointer of the search path stack of the processing target is not pointing to the array element number of the root node, return is made to step S1506. If however, the determination is that the stack pointer of the search path stack of the processing target is pointing to the array element number of the root node, at step S1511 the array element number pointed to by the stack pointer is extracted from the search path stack of the processing target and set into the area for storage of the array element number of the parent node of the processing target, and processing proceeds to step S1513.

Since the processing, as explained above in steps S1506a to S1512, can reference the discrimination bit position stored in the search path stack during the previous maximum value search processing, the processing can be faster than the splitting processing in the second embodiment proposed in Japanese Patent Application 2006-319407, previously filed by the applicant of the present invention.

At step S1513, the coupled node indicator of an empty node pair is obtained from the array. Next, at step S1514, the array element number obtained by adding 1 to the coupled node indicator is stored in the area for storage of the array element number of the insertion node.

Next, at step S1515, in order to form a leaf node, the node type is set to leaf, and the insertion key is set as the index key and stored in the array element having the array element number set at step S1514.

Next, at step S1516, the array element number obtained by adding 0 to the coupled node indicator is stored in an area for storage of the array element number of a paired node forming a pair with the insertion node. Next, at step S1517, the contents of the array element pointed to by the array element number of the parent node of the processing target set at step S1511 or step S1512 are read out and stored in an array element pointed to by the array element number of the paired node set at step S1516.

Next, at step S1518, to form a branch node the node type is set to branch, the difference bit position set at step S1505 is set as the discrimination bit position, the array element number of the paired node set at step S1516 is set as the coupled node indicator and stored into the array element pointed to by the array element number of the parent node of the processing target set at step S1511 or step S1512, and processing is ended.

Figure 16:
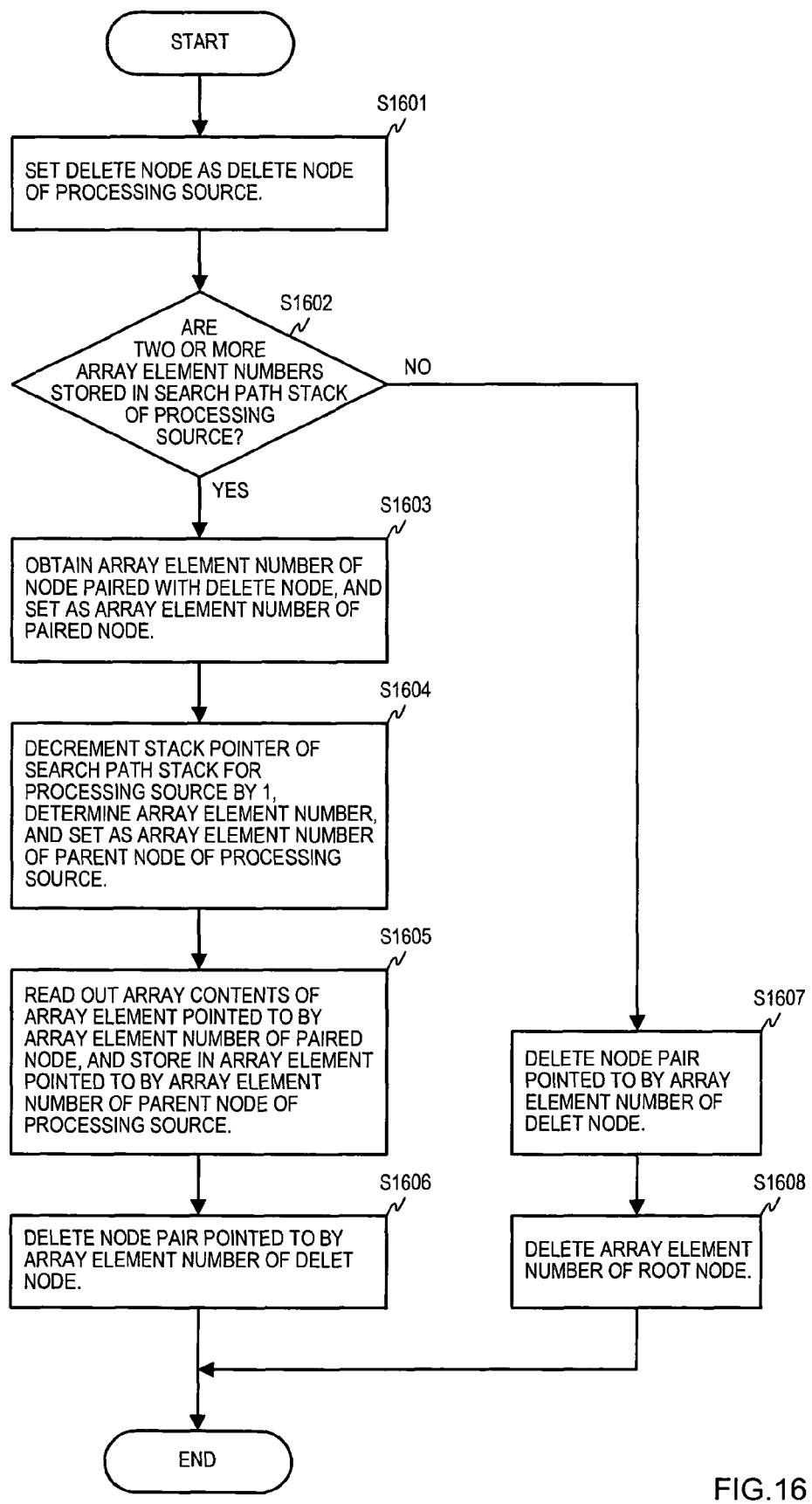
FIG. 16 is a flowchart describing the processing for deletion in the second embodiment.

FIG. 16 is a drawing showing an example of the processing flow that describes the deletion processing in the processing flow described in FIG. 13. The first step S1601 corresponds to step S1308 described in FIG. 13. Because the deletion key included in the deletion node is determined by the search for the minimum value in step S1304 described in FIG. 13, since the array element number of the array element in which the deletion key is stored is stacked on the search path stack of the processing source, that array element number is read out and set into an area for storing the deletion node.

Next, at step S1602, a determination is made as to whether or not two or more array element numbers are stored in the search path stack of the processing source. After step S1602, the processing up until step S1608 corresponds to the latter processing for deletion proposed in the Japanese Patent Application 2006-187872, which was previously filed by the applicant of the present invention.

If two or more array element numbers are not stored in the search path stack of the processing source, processing proceeds to step S1607, at which the node pair pointed to by the array element number of the deletion node set at step S1601 is deleted, and processing proceeds to step S1608, at which the array element number of the root node is deleted (that is, the registration thereof is deleted), and processing is ended.

If two or more array element numbers are stored in the search path stack of the processing source, processing proceeds to step S1603, at which the array element number of a node that forms a pair with the deletion node set at step S1601 is determined, the array element number of the paired node being set into the area for storage of the array element number of the paired node.

Next, at step S1604, the stack pointer of the search path stack of the processing source is decremented by 1 and the array element number is extracted and stored in the array element number storage area of the parent node of the processing source, which is the branch node in the immediately high order position above the deletion node.

Next, at step S1605, the contents of the array element pointed to by the array element number of the paired node set at step S1603 are read out and stored in the array element pointed to by the array element number of the parent node of the processing source set at step S1604.

Next, at step S1606, the node pair pointed to by the array element number of the deletion node is deleted, and processing is ended. While the above is a description of tree splitting processing in the second embodiment, in the second embodiment as well, similar to the first embodiment, it is possible to perform successive deletion from the maximum index key value.

Also, similar to the case of the first embodiment, it is possible to use the processing flow of splitting for the conjoining of trees. By setting one of the two trees to be conjoined as the processing source tree and performing deletion processing of the processing source tree with the split key either equal to or larger than the maximum value or equal to or less than the minimum value of the index key of the processing source tree, the deleted node can be inserted into the processing target tree.

It is clear that the bit string search processing, index key insertion processing, and the splitting/coupling processing for a coupled node tree according to the above-described embodiments and equivalents thereto can be implemented by a program that computers is caused to execute, which performs the bit string searching method, index key insertion method, and the coupled node tree splitting method and conjoining method of the present invention.

Therefore, the above-noted programs, and a computer-readable storage medium into which the programs are stored are encompassed by the embodiments of the present invention.

What is claimed is:

1. A bit string searching apparatus for searching for index keys, wherein
    based on a tree data structure that holds index keys composed of bit strings each of which is an object of searches by means of a search key composed of a bit string, comprising:
        a coupled node tree having a root node as a starting point of the tree and node pairs which are configurational elements of the tree and which are two nodes, a primary node and a non-primary node, arranged in adjacent areas of storage,
    wherein
        the nodes have an area that holds a node type, which indicates whether the node is a branch node or a leaf node, and
        the branch node having, in addition to the node type, an area that holds a discrimination bit position of the search key and an area holding information that indicates a position of a primary node of a node pair that is a link target but not having an area holding an index key composed of a bit string that is an object of searches,
        the leaf node having, in addition to the node type, an area holding an index key composed of a bit string that is the object of searches but not having an area that holds a discrimination bit position of the search key nor an area holding information that indicates the position of a primary node of a node pair that is a link target;
        a search-start-node read-out means obtaining the information indicating the position of the search start node which is one node of a node pair and reading out the search start node by means of the information indicating the position of the search start node;
        a node type determination means reading out the node type from the area that holds the node type of the node and determining whether the node type indicates a leaf node or a branch node;
        an index key read-out means reading out the index key from the area in the leaf node holding the index key;
        a link means reading out the discrimination bit position and the information indicating the position of a primary node of a node pair that is a link target from the area in the branch node holding the discrimination bit position and from the area holding the information indicating the position of the primary node of a node pair that is a link target respectively, storing in a stack the discrimination bit position read out, obtaining information indicating the node position of one of the nodes of a node pair by a calculation with a bit value in the search key for the discrimination bit position read out and the information indicating the position of a primary node of a node pair that is a link target, and, from a storage area indicated by the obtained information indicating the node position, reading out the node stored in the storage area as a link target node; and
    wherein
        the node type determination means making a determination of the node type of the search start node read out by the search-start-node read-out means, and
        if the node type indicates a leaf node,
    the index key read-out means reading out the index key from the leaf node, and
        if the node type indicates a branch node,
    repeating processes of
        the link means reading out the discrimination bit position from the branch node, storing in the stack the discrimination bit position read out, and reading out the link target node, and
        the node type determination means determining the node type of the link target node read out,
    until the node type indicates a leaf node, and
        the index key read-out means reading out the index key from the leaf node, and an index key stored in the leaf node is obtained as a search result key of an arbitrary subtree of the coupled node tree by means of the search key, the subtree having the search start node as its root node.

2. A bit string searching method wherein the bit string searching apparatus according to claim 1 searches for index keys based on the coupled node tree data structure, comprising:
    a search-start-node read-out step obtaining the information indicating the position of the search start node which is one node of a node pair and reading out the search start node by means of the information indicating the position of the search start node;
    a node type determination step reading out the node type from the area that holds the node type of the node and determining whether the node type indicates a leaf node or a branch node;
    an index key read-out step reading out the index key from the area in the leaf node holding the index key;
    a link step reading out the discrimination bit position and the information indicating the position of a primary node of a node pair that is a link target from the area in the branch node holding the discrimination bit position and from the area holding the information indicating the position of the primary node of a node pair that is a link target respectively, storing in a stack the discrimination bit position read out, obtaining information indicating the node position of one of the nodes of a node pair by a calculation with a bit value in the search key for the discrimination bit position read out and the information indicating the position of a primary node of a node pair that is a link target, and, from a storage area indicated by the obtained information indicating the node position, reading out the node stored in the storage area as a link target node; and wherein making, by the node type determination step, a determination of the node type of the search start node read out by the search-start-node read-out step, and if the node type indicates a leaf node, reading out, by the index key read-out step, the index key from the leaf node, and if the node type indicates a branch node, processes of reading out the discrimination bit position from the branch node, storing in the stack the discrimination bit position read out and the determination of the node type, by the node type determination step, of the link target node read out are repeated, until the node type indicates a leaf node, and reading out, by the index key read-out step, the index key from the leaf node, and an index key stored in the leaf node is obtained as a search result key of an arbitrary subtree of the coupled node tree by means of the search key, the subtree having the search start node as its root node.

3. A bit string searching method according to claim 2, wherein the coupled node tree is stored in an array and the information that indicates the position of a primary node is an array element number of an array element of the array in which the primary node is stored, and the array element number of an array element in which the search start node is stored and the array element numbers of array elements in which is stored the link target node from the search start node up until the leaf node are successively held in the stack.

4. A bit string searching method wherein the bit string searching apparatus according to claim 1 searches for index keys based on the coupled node tree data structure, comprising:

a search-start-node read-out step obtaining the information indicating the position of the search start node which is either the root node or one node of a node pair and reading out the search start node by means of the information indicating the position of the search start node;

a node type determination step reading out the node type from the area that holds the node type of the node and determining whether the node type indicates a leaf node or a branch node;

an index key read-out step reading out the index key from the area in the leaf node holding the index key;

a link step reading out the discrimination bit position and the information indicating the position of a primary node of a node pair that is a link target from the area in the branch node holding the discrimination bit position and from the area holding the information indicating the position of the primary node of a node pair that is a link target respectively, storing in a stack the discrimination bit position read out and reading out as a link target node only the primary nodes stored in the area indicated by the position information indicating the primary node of the node pair of the link target that is read out, or reading out as the link target node only the non-primary nodes stored in the area the position whereof obtained by a calculation based on the position information indicating the primary node of the node pair of the link target that is read out; and wherein making, by the node type determination step, a determination of the node type of the search start node read out by the search-start-node read-out step, and if the node type indicates a leaf node, reading out, by the index key read-out step, the index key from the leaf node, and if the node type indicates a branch node, processes of reading out the discrimination bit position from the branch node, storing in the stack the discrimination bit position read out and reading out the link target node by the link step and the determination of the node type, by the node type determination step, of the link target node read out are repeated, until the node type indicates a leaf node, and reading out, by the index key read-out step, the index key from the leaf node, and obtaining an index key stored in the leaf node read out in the index key read-out step as a search result key, which is a minimum or maximum value of the index keys, of the coupled node tree or of a subtree of the coupled node tree having the search start node as its root node by means of the search key.

5. A bit string searching method according to claim 4, wherein the coupled node tree is stored in an array and the information that indicates the position of a primary node is an array element number of an array element of the array in which the primary node is stored, and the array element number of an array element in which the search start node is stored and the array element numbers of array elements in which is stored the link target from the search start node up until the leaf node are successively held in the stack.

6. An index key insertion method, wherein the bit string searching apparatus according to claim 1 inserts a desired insertion key composed of a bit string as the index key into the coupled node tree, comprising:

a search step wherein, using the insertion key as the search key, the node type of the root node is read out, and a determination of the node type read out is made, and if the node type indicates a leaf node, the index key is read out from the leaf node and if the node type indicates a branch node, processes of reading out the discrimination bit position from the branch node, storing in a stack the discrimination bit position read out, obtaining information indicating a node position of one of the nodes of a node pair by a calculation with a bit value in the search key for the discrimination bit position read out and the information indicating the position of a primary node of a node pair that is a link target, storing in the stack the obtained information indicating the node position, and, from a storage area indicated by the obtained information indicating the node position, reading out the node stored in the storage area as a link target node, and the determination of the node type of the link target node read out
are repeated, until the node type indicates a leaf node;
a comparison step wherein
a value comparison and bit string comparison is made between the index key read out from the leaf node in the search step and the insertion key;
an empty node pair obtaining step wherein
two empty adjacent areas of storage to store a node pair are obtained and position information of the primary node of the node pair is obtained;
a leaf node storage position decision step wherein
a decision is made, by means of the value comparison in the comparison step, as to which of the two empty adjacent areas of storage obtained in the empty node pair obtaining step is to be the leaf node holding the insertion key;
a node pair insertion position decision step wherein
position information stored in the stack is read out by relative positional relationship between the bit position of a first differing bit found in the bit string comparison in the comparison step and the discrimination bit position of the branch node stored in the stack and
the node stored in the area pointed to by that position information is decided to be the insertion position as a link origin of the node pair to be stored in the two empty adjacent areas of storage obtained in the empty node pair obtaining step;
an insertion node pair generating step wherein
an insertion node pair is generated by writing the node type indicating a leaf node into the node type area of the leaf node arranged in the empty area that has been decided in the node pair insertion position decision step and writing the insertion key into the area holding the index key and reading out contents of the node stored in the area pointed to by the position information read out from the stack in the node pair insertion position decision step and writing the contents into the other area of the two empty adjacent areas of storage; and
a branch node generating step, wherein
the node stored in the area pointed to by the position information read out from the stack in the node pair insertion position decision step is made into a branch node by writing the node type indicating a branch node into the area holding the node type, writing the bit position of the first differing bit found in the bit string comparison in the comparison step into the area holding the discrimination bit position, and writing the position information obtained in the empty node pair obtaining step into the area holding the position information of the primary node of the node pair that is the link target.

7. An index key insertion method according to claim 6, wherein the coupled node tree is stored in an array and the position information is an array element number of an array element of the array in which a primary node corresponding to the position information is stored.

8. A coupled node tree splitting method
for splitting a coupled node tree being used in a bit string search and having a root node as a starting point of the tree and node pairs which are configurational elements of the tree and which are two nodes, a primary node and a non-primary node, arranged in adjacent areas of storage,
wherein
the nodes have an area that holds a node type, which indicates whether the node is a branch node or a leaf node, and
the branch node having, in addition to the node type, an area that holds a discrimination bit position of a search key and an area holding information that indicates a position of a primary node of a node pair that is a link target but not having an area holding an index key composed of a bit string that is an object of searches,
the leaf node having, in addition to the node type, an area holding the index key composed of a bit string that is the object of searches but not having an area that holds a discrimination bit position of the search key nor an area holding information that indicates the position of a primary node of a node pair that is a link target, comprising;
a step of obtaining a split key that establishes an index key that splits a processing source coupled node tree that is to be split;
a processing source minimum value or maximum value obtaining step that determines a minimum value or a maximum value of the index keys of the processing source coupled node tree, by performing sub-steps of
a search-start-node read-out sub-step obtaining information indicating a position of the root node of the processing source coupled node tree as a search start node and reading out the search start node by means of the information indicating the position of the search start node,
a node type determination sub-step reading out the node type from the area that holds the node type of the node and determining whether the node type indicates a leaf node or a branch node,
an index key read-out sub-step reading out the index key from the area in the leaf node holding the index key,
a link sub-step reading out the discrimination bit position and the information indicating the position of a primary node of a node pair that is a link target from the area in the branch node holding the discrimination bit position and from the area holding the information indicating the position of the primary node of a node pair that is a link target respectively, storing in a stack the discrimination bit position read out and reading out as a link target node only the primary nodes stored in the area indicated by the position information indicating the primary node of the node pair of the link target that is read out, or reading out as the link target node only the non-primary nodes stored in the area the position whereof obtained by a calculation based on the position information indicating the primary node of the node pair of the link target that is read out, and
wherein
making, by the node type determination sub-step, a determination of the node type of the search start node read out by the search-start-node read-out sub-step, and
if the node type indicates a leaf node,
reading out, by the index key read-out sub-step, the index key from the leaf node, and
if the node type indicates a branch node,
processes of
reading out the discrimination bit position from the branch node, storing in the stack the discrimination bit position read out and reading out the link target node by the link sub-step and the determination of the node type, by the node type determination sub-step, of the link target node read out are repeated, until the node type indicates a leaf node, and reading out, by the index key read-out sub-step, the index key from the leaf node, and obtaining an index key stored in the leaf node read out in the index key read out sub-step as a search result key, which is a minimum or maximum value of the index keys of the processing source coupled node tree;

a comparing step of comparing the split key with either the minimum value or the maximum value and, if the minimum value is larger than the split key or if the maximum value is smaller than the split key, ending processing;

a generating step of, if the result of the comparison is that the minimum value is not larger than the split key or the maximum value is not smaller than the split key, inserting the minimum value or maximum value index key by using the index key insertion method according to claim 6, so as to generate a new processing target coupled node tree;

a deleting step of deleting the minimum value or maximum value index key from the processing source coupled node tree; and wherein by making the processing source coupled node tree from which has been deleted the minimum value or maximum value index key into a new processing source coupled node tree, the processing source minimum value or maximum value obtaining step, the comparing step, the generating step, and the deleting step are repeated until the minimum value or maximum value obtained by the processing source minimum value or maximum value obtaining step becomes larger than or smaller than the split key respectively.

9. A coupled node tree splitting method according to claim 8, wherein the coupled node tree is stored in an array and the position information is an array element number of an array element of the array in which a node corresponding to the position information is stored, and an address information of an area wherein is positioned the search start node and the link target node is the array element number of an array element in which the search start node is stored and the array element number of an array element in which the link target node is stored, wherein the generating step includes a step that sets the minimum value or maximum value determined by the processing source minimum value or maximum value obtaining step as the insertion key of the processing target coupled node tree, obtains a maximum value or a minimum value of the index key of the processing target coupled node tree, by performing sub-steps of a search-start-node read-out sub-step obtaining the array element number indicating the position of the root node of the processing target coupled node tree as a search start node and reading out the search start node by means of the array element number of the search start node, a node type determination sub-step reading out the node type from the area that holds the node type of the node and determining whether the node type indicates a leaf node or a branch node, an index key read-out sub-step reading out the index key from the area in the leaf node holding the index key, a link sub-step reading out the discrimination bit position and the array element number indicating the position of a primary node of a node pair that is a link target from the area in the branch node holding the discrimination bit position and from the area in the branch node holding the array element number indicating the position of the primary node of a node pair that is a link target respectively, storing in a stack the discrimination bit position read out and reading out as a link target node only the non-primary nodes stored in the area the position whereof obtained by a calculation based on the array element number indicating the primary node of the node pair of the link target that is read out or reading out as the link target node only the primary nodes stored in the area indicated by the array element number indicating the primary node of the node pair of the link target that is read out, and wherein making, by the node type determination sub-step, a determination of the node type of the search start node read out by the search-start-node read-out sub-step, and if the node type indicates a leaf node, reading out, by the index key read-out sub-step, the index key from the leaf node, and if the node type indicates a branch node, processes of reading out the discrimination bit position from the branch node, storing in the stack the discrimination bit position read out and reading out the link target node by the link sub-step and the determination of the node type, by the node type determination sub-step, of the link target node read out are repeated, until the node type indicates a leaf node, and reading out, by the index key read-out sub-step, the index key from the leaf node, and obtaining an index key stored in the leaf node read out in the index key read out sub-step as a search result key, which is the maximum or minimum value of the index keys of the processing target coupled node tree, performs a bit string comparison between the insertion key and the maximum value or the minimum value of the index keys of the processing target coupled node tree to determine a highest order bit position at which a bit value differs, establishes, from the relative position relationship between the highest order bit position and the discrimination bit positions stored in the stack, a processing target parent node that is an insertion position of a node pair that includes the leaf node that holds the index key, and takes the array element number of the array element into which the primary node of the node pair that includes the leaf node holding the insertion key is stored as the position information of the processing target parent node.

10. A coupled node tree splitting method according to claim 9, wherein the generating step includes a further step for setting the processing target parent node as inserted node below which the leaf node including the insertion key has been inserted, and wherein the processing target maximum value or minimum value obtaining step obtains the maximum value or the minimum value of the index key of the processing target coupled node tree with the inserted node as the search start node.

11. A coupled node tree splitting method according to claim 10, wherein the deleting step includes a step that sets as a processing source coupled node tree deletion node the leaf node that includes the minimum value or the maximum value obtained by the processing source minimum value or maximum value obtaining step as the index key, stores the contents of the node forming the same node pair with the deletion node into the branch node of the link source of that node pair, and deletes the node pair.

12. A coupled node tree conjoining method for conjoining two coupled node trees each of which is used in a bit string search and having a root node as a starting point of the tree and node pairs which are configurational elements of the tree and which are two nodes, a primary node and a non-primary node, arranged in adjacent areas of storage, wherein the nodes have an area that holds a node type, which indicates whether the node is a branch node or a leaf node, and the branch node having, in addition to the node type, an area that holds a discrimination bit position of a search key and an area holding information that indicates a position of a primary node of a node pair that is a link target but not having an area holding an index key composed of a bit string that is an object of searches, the leaf node having, in addition to the node type, an area holding the index key composed of a bit string that is the object of searches but not having an area that holds a discrimination bit position of the search key nor an area holding information that indicates the position of a primary node of a node pair that is a link target, comprising;

a processing source minimum value or maximum value obtaining step that determines a minimum value or a maximum value of the index keys of a processing source coupled node tree, that is, one of two coupled node trees, by performing sub-steps of a search-start-node read-out sub-step obtaining information indicating a position of the root node of the processing source coupled node tree as a search start node and reading out the search start node by means of the information indicating the position of the search start node, a node type determination sub-step reading out the node type from the area that holds the node type of the node and determining whether the node type indicates a leaf node or a branch node, an index key read-out sub-step reading out the index key from the area in the leaf node holding the index key, a link sub-step reading out the discrimination bit position and the information indicating the position of a primary node of a node pair that is a link target from the area in the branch node holding the discrimination bit position and from the area in the branch node holding the information indicating the position of the primary node of a node pair that is a link target respectively, storing in a stack the discrimination bit position read out and reading out as a link target node only the primary nodes stored in the area indicated by the position information indicating the primary node of the node pair of the link target that is read out, or reading out as the link target node only the non-primary nodes stored in the area the position whereof obtained by a calculation based on the position information indicating the primary node of the node pair of the link target that is read out, and wherein making, by the node type determination sub-step, a determination of the node type of the search start node read out by the search-start-node read-out sub-step, and if the node type indicates a leaf node, reading out, by the index key read-out sub-step, the index key from the leaf node, and if the node type indicates a branch node, processes of reading out the discrimination bit position from the branch node, storing in the stack the discrimination bit position read out and reading out the link target node by the link sub-step and the determination of the node type, by the node type determination sub-step, of the link target node read out are repeated, until the node type indicates a leaf node, and reading out, by the index key read-out sub-step, the index key from the leaf node, and obtaining an index key stored in the leaf node read out in the index key read out sub-step as a search result key, which is the minimum or maximum value of the index keys of the processing source coupled node tree;

an inserting step that inserts the minimum value or the maximum value into a processing target coupled node tree, that is, other coupled node tree of the two coupled node trees by using the index key insertion method according to claim 6;

a deleting step that deletes the minimum value or the maximum value from the processing source coupled node tree; and wherein by making the processing source coupled node tree from which has been deleted the minimum value or maximum value index key into a new processing source coupled node tree, the processing source minimum value or maximum value obtaining step, the inserting step, and the deleting step are repeated until the processing source coupled node tree is completely deleted.

13. A coupled node tree conjoining method according to claim 12, wherein the two coupled node trees are stored in an array or two, and the position information is an array element number of an array element of the array into which a node corresponding to the position information is stored, and the address information of the area wherein is positioned the search start node and the link target node is the array element number of an array element in which the search start node is stored and the array element number of an array element in which the link target is stored, and wherein the inserting step includes a step that sets the minimum value or the maximum value as the insertion key of the processing target coupled node tree, obtains a maximum value or a minimum value of the index keys of the processing target coupled node tree, by performing sub-steps of a search-start-node read-out sub-step obtaining the array element number indicating the position of the root node of the processing target coupled node tree as the search start node and reading out the search start node by means of the array element number of the search start node, a node type determination sub-step reading out the node type from the area that holds the node type of the node and determining whether the node type indicates a leaf node or a branch node, an index key read-out sub-step reading out the index key from the area in the leaf node holding the index key, a link sub-step reading out the discrimination bit position and the array element number indicating the position of a primary node of a node pair that is a link target from the area in the branch node holding the discrimination bit position and from the area in the branch node holding the array element number indicating the position of the primary node of a node pair that is a link target respectively, storing in a stack the discrimination bit position read out and reading out as a link target node only the non-primary nodes stored in the area the position whereof obtained by a calculation based on the array element number indicating the primary node of the node pair of the link target that is read out, or reading out as the link target node only the primary nodes stored in the area indicated by the array element number indicating the primary node of the node pair of the link target that is read out, and wherein making, by the node type determination sub-step, a determination of the node type of the search start node read out by the search-start-node read-out sub-step, and if the node type indicates a leaf node, reading out, by the index key read-out sub-step, the index key from the leaf node, and if the node type indicates a branch node, processes of reading out the discrimination bit position from the branch node, storing in the stack the discrimination bit position read out and reading out the link target node by the link sub-step and the determination of the node type, by the node type determination sub-step, of the link target node read out are repeated, until the node type indicates a leaf node, and reading out, by the index key read-out sub-step, the index key from the leaf node, and obtaining an index key stored in the leaf node read out in the index key read out sub-step as a search result key, which is the maximum or minimum value of the index keys of the processing target coupled node tree, performs a bit string comparison between the insertion key and the maximum value or the minimum value of the index keys of the processing target coupled node tree to determine a highest order bit position at which a bit value differs, establishes, from the relative position relationship between the highest order bit position and a discrimination bit position stored in the stack, a processing target parent node that is an insertion position of a node pair that includes the leaf node that holds the index key, and takes the array element number of the array element into which the primary node of a node pair that includes the leaf node holding the insertion key is stored as a position information of the processing target parent node.

14. A coupled node tree conjoining method according to claim 13, wherein the deleting step includes a step that sets the leaf node that includes the minimum value or the maximum value obtained by the processing source minimum value or maximum value obtaining step as a deletion node of the processing source coupled node tree, stores the contents of the node forming the same node pair with the deletion node into the branch node of the link source of that node pair, and deletes the node pair.

15. A program that a computer is caused to execute, for performing the bit string searching method according to claim 2.

16. A computer-readable storage medium storing the program according to claim 15.

17. A program that a computer is caused to execute, for performing the bit string searching method according to claim 4.

18. A computer-readable storage medium storing the program according to claim 17.

19. A program that a computer is caused to execute, for performing the index key insertion method according to claim 6.

20. A computer-readable storage medium storing the program according to claim 19.

21. A program that a computer is caused to execute, for performing the coupled node tree splitting method according to claim 8.

22. A computer-readable storage medium storing the program according to claim 21.

23. A program that a computer is caused to execute, for performing the coupled node tree conjoining method according to claim 12.

24. A computer-readable storage medium storing the program according to claim 23.

* * * * *